(12) United States Patent
Ding

(10) Patent No.: US 11,386,905 B2
(45) Date of Patent: Jul. 12, 2022

(54) INFORMATION PROCESSING METHOD AND DEVICE, MULTIMEDIA DEVICE AND STORAGE MEDIUM

(71) Applicant: Tencent Technology (Shenzhen) Company Limited, Shenzhen (CN)

(72) Inventor: Ke Ding, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 457 days.

(21) Appl. No.: 16/601,458

(22) Filed: Oct. 14, 2019

(65) Prior Publication Data
US 2020/0043502 A1 Feb. 6, 2020

Related U.S. Application Data

(63) Continuation of application No. PCT/CN2017/114146, filed on Nov. 30, 2017.

(51) Int. Cl.
*G10L 17/00* (2013.01)
*G06F 16/68* (2019.01)
*G10L 17/06* (2013.01)

(52) U.S. Cl.
CPC .......... *G10L 17/00* (2013.01); *G06F 16/686* (2019.01); *G10L 17/06* (2013.01)

(58) Field of Classification Search
CPC ......... G10L 15/08; G10L 15/22; G10L 15/26; G10L 17/00; G10L 17/02; G10L 17/10;
(Continued)

(56) References Cited

U.S. PATENT DOCUMENTS 9,865,267 B2 * 1/2018 Du .................. G10L 17/24
10,091,190 B2 * 10/2018 Camenisch .......... G06F 21/604
(Continued)

FOREIGN PATENT DOCUMENTS

CN 103442290 A 12/2013
CN 104331407 A 2/2015
(Continued)

OTHER PUBLICATIONS

Feng, Huan, Kassem Fawaz, and Kang G. Shin. "Continuous authentication for voice assistants." Proceedings of the 23rd Annual International Conference on Mobile Computing and Networking. 2017. (Year: 2017).*
(Continued)

*Primary Examiner* — Edgar X Guerra-Erazo
(74) *Attorney, Agent, or Firm* — Morgan, Lewis & Bockius LLP

(57) ABSTRACT

The present disclosure discloses an information processing method, a service providing system, and a computer storage medium. The method includes: assigning at least one first account for a multimedia device; assigning a plurality of second accounts associated with the first account for the multimedia device, each second account representing one user identifier; acquiring a voice instruction; determining a currently used second account according to the voice instruction; searching for user preference information associated with the currently used second account; and providing, based on the user preference information and service request information determined based on the voice instruction, a first service to the user identifier represented by the currently used second account.

20 Claims, 14 Drawing Sheets

(58) Field of Classification Search
CPC ......... G10L 17/22; G10L 17/24; G10L 17/26;
G10L 2021/0135; G10L 21/013; G10L
21/028; G10L 25/00; G10L 25/18; G10L
25/15; G10L 25/21; G10L 25/24; G10L
25/30; G10L 25/27; G10L 25/51; G10L
25/54; G10L 25/60; G10L 25/63; G10L
25/66; G10L 25/69; G10L 25/72; G10L
25/75; G10L 2025/783; G10L 2025/786;
G10L 25/87
See application file for complete search history.

(56) References Cited

U.S. PATENT DOCUMENTS

| | | | | |
|---|---|---|---|---|
| 10,580,413 | B2* | 3/2020 | Zhang | G06F 3/167 |
| 11,055,721 | B2* | 7/2021 | He | G06Q 20/40145 |
| 2006/0277043 | A1* | 12/2006 | Tomes | G10L 17/24 |
| | | | | 704/E17.016 |
| 2007/0055517 | A1* | 3/2007 | Spector | G07C 9/37 |
| | | | | 704/E17.016 |
| 2013/0132988 | A1 | 5/2013 | Lee et al. | |
| 2015/0120552 | A1* | 4/2015 | He | G06Q 20/42 |
| | | | | 705/44 |
| 2017/0004832 | A1* | 1/2017 | Du | G10L 17/24 |
| 2019/0147885 | A1* | 5/2019 | Zhang | G06F 21/32 |
| | | | | 704/244 |
| 2020/0151601 | A1* | 5/2020 | Niewczas | H04L 67/18 |

FOREIGN PATENT DOCUMENTS

| | | | |
|---|---|---|---|
| CN | 104899485 | A | 9/2015 |
| CN | 105263052 | A | 1/2016 |
| CN | 105681835 | A | 6/2016 |
| CN | 105744368 | A | 7/2016 |
| CN | 105847884 | A | 8/2016 |
| CN | 105915491 | A | 8/2016 |
| CN | 105979376 | A | 9/2016 |
| CN | 106489269 | A | 3/2017 |
| CN | 107104875 | A | 8/2017 |
| JP | 2015099461 | A | 5/2015 |
| WO | WO 2013085176 | A1 | 6/2013 |
| WO | WO-2015196063 | A1 * | 12/2015 ............ G06F 21/32 |

OTHER PUBLICATIONS

A. A. Arriany and M. S. Musbah, "Applying voice recognition technology for smart home networks," 2016 International Conference on Engineering & MIS (ICEMIS), 2016, pp. 1-6. (Year: 2016).*

Tencent Technology, ISRWO, PCT/CN2017/114146, dated Jul. 27, 2018, 7 pgs.

Tencent Technology, IPRP, PCT/CN2017/114146, dated Jun. 2, 2020, 5 pgs.

* cited by examiner

INFORMATION PROCESSING METHOD AND DEVICE, MULTIMEDIA DEVICE AND STORAGE MEDIUM

CROSS-REFERENCE TO RELATED APPLICATIONS

This application is a continuation application of PCT/CN2017/114146, entitled "INFORMATION PROCESSING METHOD AND APPARATUS, MULTIMEDIA DEVICE, AND STORAGE MEDIUM" filed on Nov. 30, 2017, which is incorporated by reference in its entirety.

FIELD OF THE TECHNOLOGY

The present disclosure relates to the field of information technologies, and in particular, to an information processing method and computing device, a multimedia device, and a storage medium.

BACKGROUND OF THE DISCLOSURE

With development of electronic technologies and network technologies, more intelligent devices may receive the Internet by using user accounts, and the Internet may recommend various personalized services such as audios and videos that users may like to the devices according to data such as historical operation behaviors of the user accounts. The personalized services are services that are needed by the users, such as song recommendation, and that are provided according to personal behavior features or personal preferences of the users. However, during specific implementation, it is found that sometimes the personalized services are not needed by the users. Such imprecisely recommended personalized services fail to improve user experience or help the users obtain more satisfactory services, and the recommendation of the personalized services may be an information disturbance, or the direct selection of the personalized services limits the user selection. In addition, such imprecise personalized services of the Internet result in a lot of inefficient recommendations in recommendation or service processes, occupy a lot of network resources, and have poor effects and low precision.

SUMMARY

In view of this, embodiments of the present disclosure are expected to provide an information processing method and apparatus, a multimedia device, and a storage medium, to resolve at least one of the foregoing problems.

Technical solutions of the embodiments of the present disclosure are implemented in this way:

The embodiments of the present disclosure provide an information processing method, applied to a computing device having one or more processors and memory storing a plurality of programs to be executed by the one or more processors, the method including:

assigning at least one first account for a multimedia device coupled to the computing device, the first account being associated with a first application service provider;

assigning a plurality of second accounts associated with the first account for the multimedia device, each second account representing one user identifier and having associated user preference information;

acquiring, via the multimedia device, a voice instruction from a user;

determining, among the plurality of second accounts, a currently used second account and service request information according to the voice instruction;

searching for user preference information associated with the currently used second account; and providing, based on the user preference information and the service request information determined based on the voice instruction, a first service returned by the first application service provider to the user identifier represented by the currently used second account.

The embodiments of the present disclosure provide a computing device having one or more processors and memory storing a plurality of programs that, when executed by the one or more processors, cause the computing device to perform the aforementioned information processing method.

The embodiments of the present disclosure provide a non-transitory computer storage medium, the computer storage medium storing computer executable instructions for execution by one or more processors of a computing device, and the computer executable instructions being used for performing the foregoing information processing method.

In the information processing method and system, and the storage medium provided in the embodiments of the present disclosure, at least one first account is set for one multimedia device, and a plurality of second accounts is associated and set in one first account. The first account may be used for connecting to a pre-determined system, and different second accounts are configured for different users.

On one hand, problems such as a large quantity of accounts and management confusion caused by setting one first account for each user can be avoided.

On the other hand, one first account corresponds to a plurality of second accounts, and targeted personalized services meeting personal preferences and requirements of users can be provided based on preference information of different users corresponding to the second accounts. Therefore, the problem in the related technology that the preference information cannot be precisely obtained to precisely provide the personalized services because some multimedia devices shared by a plurality of users do not distinguish the users is resolved, thereby precisely providing the personalized services, and improving device intelligence and user experience satisfaction.

DESCRIPTION OF EMBODIMENTS

The following describes preferred embodiments of the present disclosure in detail with reference to the accompanying drawings. It needs to be understood that, the following described preferred embodiments are merely used to describe and explain the present disclosure, but are not used to limit the present disclosure.

Figure 1:
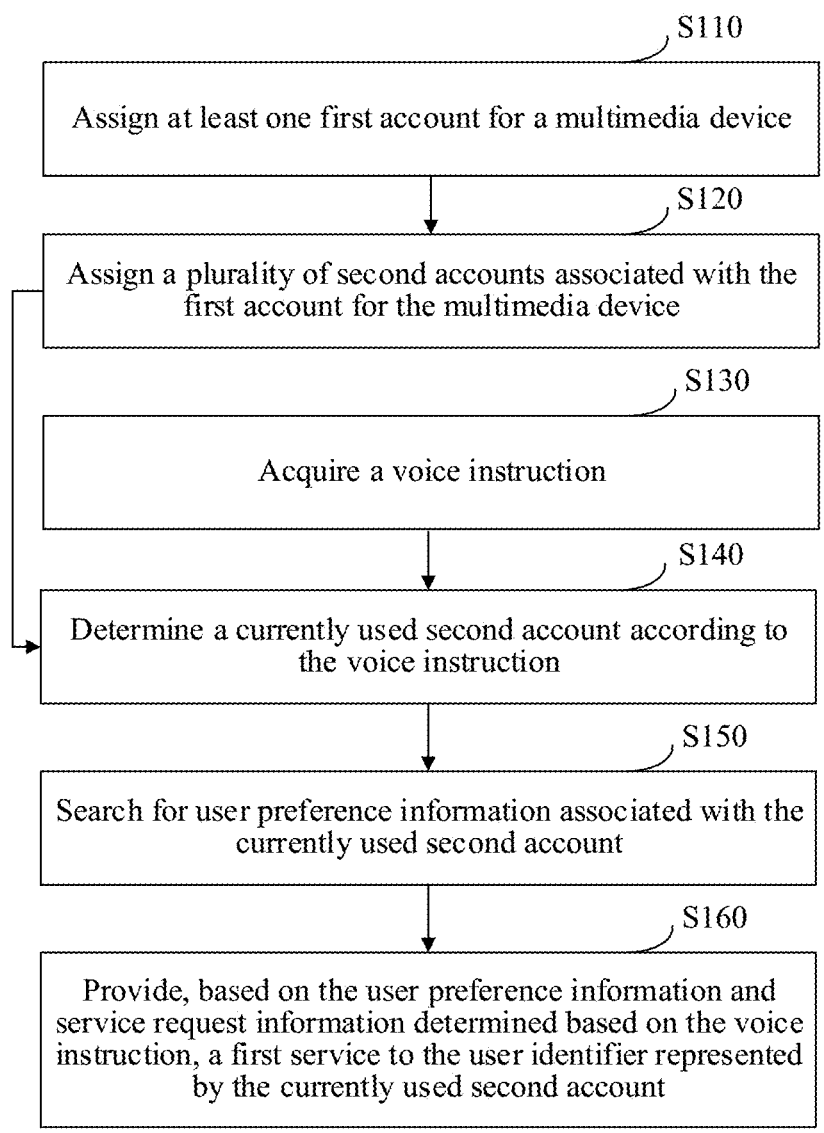
FIG. 1 is a schematic flowchart of an information processing method according to an embodiment of the present disclosure.

As shown in FIG. 1, this embodiment provides an information processing method, including:

Step S110: Assign at least one first account for a multimedia device.

Step S120: Assign a plurality of second accounts associated with the first account for the multimedia device, each second account representing one user identifier.

Step S130: Acquire a voice instruction.

Step S140: Determine a currently used second account according to the voice instruction.

Step S150: Search for user preference information associated with the currently used second account.

Step S160: Provide, based on the user preference information and service request information determined based on the voice instruction, a first service to the user identifier represented by the currently used second account.

In this embodiment, the method may be applied to a management device of the multimedia device or may be directly applied to the multimedia device. If the information processing method disclosed in this embodiment is applied to the management device, a transmission link is established between the management device and the multimedia device. For example, the multimedia device accesses the Internet through a wired interface such as a wireless local area network (WiFi) or an optical cable, and further establishes a connection to the management device.

The multimedia device may be a device that can provide a multimedia service, for example, an audio device that can provide an audio service such as a speaker, or a video device that can provide a video service. For example, in this embodiment, the multimedia device is user equipment such as a speaker and/or a TV. In some embodiments, the multimedia device may be an interactive device that can be configured to perform information interaction, for example, may be an intelligent speaker that performs voice interaction, or may be a device that performs voice and/or image interaction with users such as an intelligent computer. In this embodiment, the multimedia device is optionally an intelligent home device. The intelligent home device may include: a home speaker, a home theater device, an intelligent refrigerator and the like.

The multimedia device may be a sharing device shared by a plurality of users, for example, a home sharing device shared by family members or a conference sharing device shared by colleagues.

Generally, only one account is set for these devices, but if the same user account is used when these devices are used by different users, personalized services provided for historical behavior data and/or attribute information of this user account obviously may cause an imprecision problem. In this embodiment, first, a plurality of second accounts associated with a first account is set in the multimedia device, then, user preference information corresponding to each second account is recorded, and the preference information is used to provide a second service, so that a service meeting a personalized requirement of each user can be precisely provided to the user, thereby improving device intelligence and precision of the personalized service. One second account may be one user identifier, the user identifier may be a user name, a user number, or any other information that may refer to a specific user and that has an identification effect.

The pre-determined system may be a system providing multimedia service support to the multimedia device. For example, if the multimedia device is an audio device, the pre-determined system may be an audio service system that may provide various audio services played by the audio device, for example, music, broadcast, and news. The audio device is connected to the pre-determined system through a network, to obtain information content of multimedia information from the pre-determined system and output the information content, so that the user may listen to the music, broadcast, and news, to enjoy various audio services. A typical audio service system may be a third-party audio service platform, for example, a music service system of QQ audios.

For another example, if the multimedia device is a video device, the pre-determined system may be a video service system that may provide various video services, for example, a Tencent video system that may provide various videos for the video device to output, so that the user may watch movies, TV series, variety programs, or learning videos, and the like.

In this embodiment, at least one first account that can log in to the pre-determined system and obtain a multimedia service from pre-determined information is configured for the multimedia device, and a plurality of second accounts may be configured for the multimedia device. The plurality of second accounts may be associated with the same first account.

In this embodiment, the first account and the second account may be different types of accounts. The first account is an account recognized by the pre-determined system or authorized to use the pre-determined system to provide the multimedia service. Usually, the pre-determined system stores the first account. In addition, in addition to the first account, the pre-determined system may further store a device number of the multimedia device bound with the first account, and user information of one or more users that may use the first account.

The second account cannot be generally recognized by the pre-determined system, and is an account assigned or set by the multimedia device itself or a management system of the multimedia device, and an account recognized by only the multimedia information itself or the management system. Therefore, from this level, the second account may also be called an account that can be recognized by only the multimedia device itself or the management system in which the multimedia device is located.

In some cases, an operating system of a multimedia system or the management system of the multimedia device may also be called an internal system of the device, but the pre-determined system is an external system connected to the internal system of the multimedia device. Therefore, from this level, the second account may also be called an internal account. The first account is an account that may be recognized by the multimedia information or another system (for example, a third-party platform or a third application (APP)) in addition to the management system, and therefore may be called an external account. Usually, an APP of the external system is installed in the multimedia device, and the multimedia device may be connected to the external system by using the APP.

In some embodiments, the first account may correspond to one account identifier, and the account identifier may be a communication identifier such as a phone number of a main user. In addition to a mobile communication identifier such as a phone number, the communication identifier may further be an instant messaging communication identifier, for example, an account having an identity identifier, such as a WeChat number or a Weibo number or a QQ number. In some embodiments, the first account may be an account assigned by the pre-determined system, and therefore may be recognized by the pre-determined system. The second account may be an account that is assigned by the multimedia device or the management device of the multimedia device, and that is not stored in the pre-determined system, and therefore is not recognized by the pre-determined system.

Therefore, at least one first account is configured for the multimedia device in step S110 in this embodiment, and the first account is used to log in to the pre-determined system, so that the multimedia device performs information interaction with the pre-determined system based on the first account, for example, transmits a multimedia service obtaining request carrying the first account to the pre-determined system.

Figure 2:
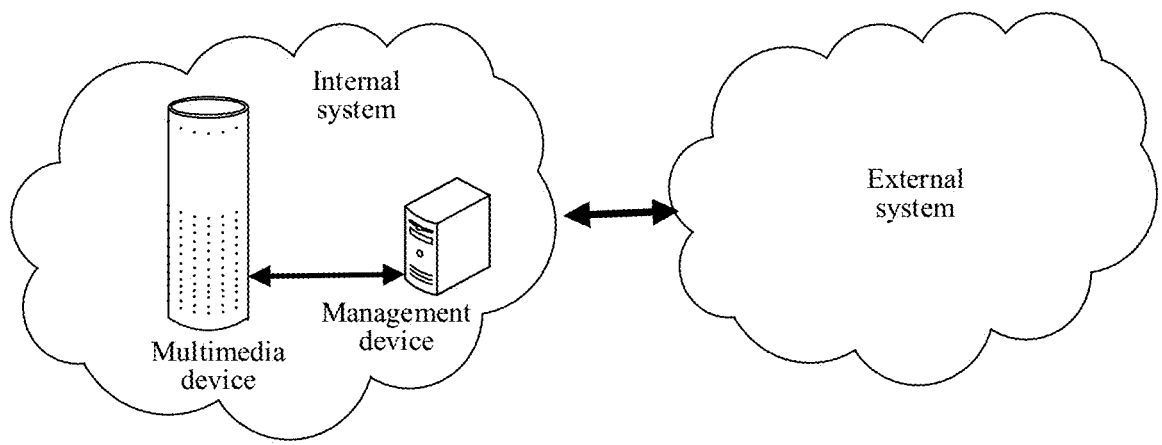
FIG. 2 is a schematic diagram of a connection between a multimedia device and an external system according to an embodiment of the present disclosure.
Figure 3:
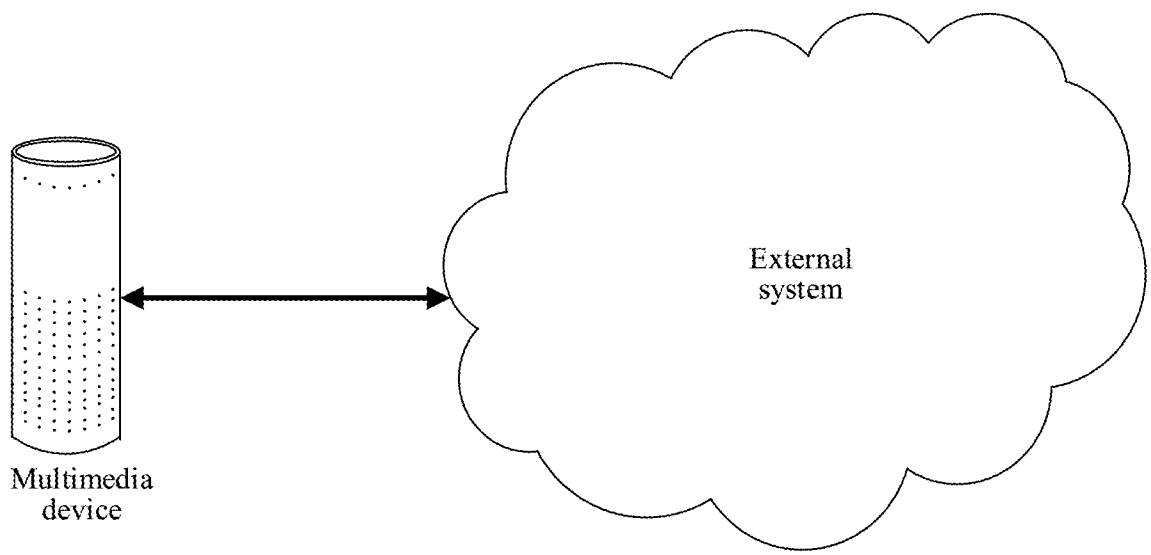
FIG. 3 is a schematic diagram of a connection between another multimedia device and an external system according to an embodiment of the present disclosure.

As shown in FIG. 2, a system in which a multimedia device is located is an internal system. In addition to the multimedia device, the internal system further includes a management device connected for the multimedia device. The management device provides various data support and/or management to the multimedia device. The multimedia device may be connected to an external system through the management device. The data support may include: data required for providing system upgrade or maintenance of the multimedia device itself. A multimedia device shown in FIG. 3 is directly connected to an external system.

Figure 4:
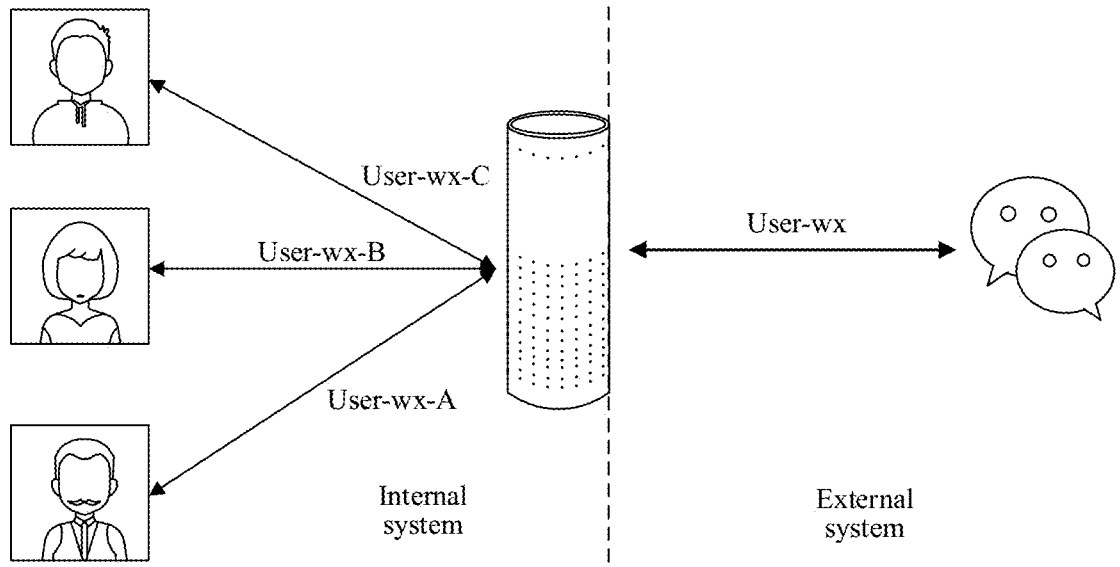
FIG. 4 is a schematic diagram of a correspondence between second accounts and a first account according to an embodiment of the present disclosure.
Figure 5:
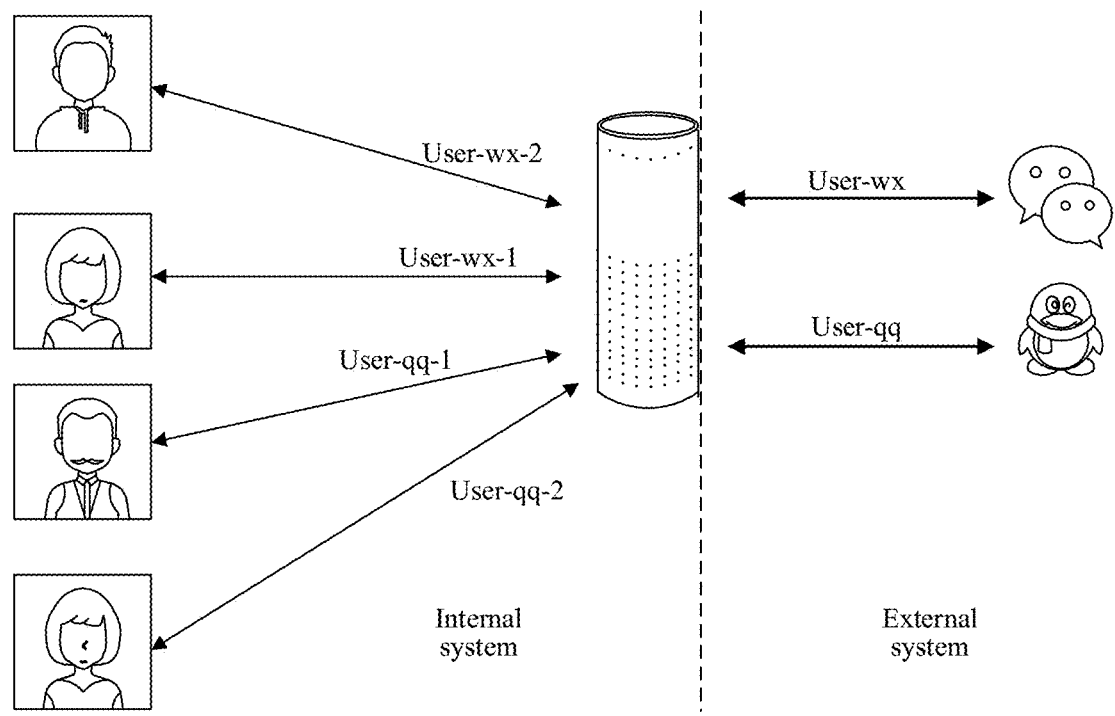
FIG. 5 is a schematic diagram of another correspondence between second accounts and first accounts according to an embodiment of the present disclosure.

As shown in FIG. 4, one first account User-wx that may be connected to a pre-determined system is set in a multimedia device, and the multimedia device may be used by three users. Therefore, three second accounts, respectively User-wx-A, User-wx-B, and User-wx-C, are set for User-wx. Only one first account is configured for the multimedia device shown in FIG. 4. In some cases, a plurality of first accounts may be set for one multimedia device. As shown in FIG. 5, two first accounts that may be applied to an external system, respectively User-wx and User-qq, are set for a multimedia device. Second accounts corresponding to User-wx include: User-wx-1, User-wx-2, and User-wx-3. Second accounts corresponding to User-qq include: User-qq-1 and User-qq-2.

In this embodiment, to simplify the correspondence between the second accounts and the first accounts, usually account identifiers of the second accounts include: account identifiers of the first accounts plus internal identification information. Identification information of the second accounts herein may be an internal sequence number. For example, if the first account is: User-qq, the second accounts may be User-qq-1 to User-qq-s, where s may be the largest number of second accounts (namely, the largest quantity of second accounts) that may be assigned for one first account. In this way, the correspondence between the second accounts and the first accounts may be determined by using two accounts themselves, and there is no need of particularly establishing the correspondence between the second accounts and the first accounts.

The first service may be various types of services, for example, an audio service or a video service, a recommendation service for recommending multimedia information, and a sharing service for sharing information with social friends.

In the multimedia device or the device connected to the multimedia device, user preference information is recorded corresponding to the second accounts.

A voice instruction is acquired in step S130, and the voice instruction is generated based on user voice, and is used for controlling the multimedia device to provide various services. Therefore, the voice instruction may further be used in the multimedia device to determine service request information through content recognition. The service request information may be an operation parameter, and the operation parameter may include: an operation type and an operation value carried in the operation type. The operation type may include: requesting a song, switching a song, and the like. The operation value may refer to a song or a TV program switched to. In this embodiment of the present disclosure, the voice instruction may be not only used in the multimedia device to obtain the service request information, but also used for recognizing a second account corresponding to a current user. Therefore, user preference information corresponding to the user is determined, to provide a first service meeting a personalized requirement of the user to the user.

The user preference information may include: a user like feature and/or a user dislike feature. The user like feature and/or the user dislike feature may be determined based on at least one of user historical behavior data and user attribute information. The user like feature is used for representing a service liked by the user; and the user dislike feature is used for representing a service disliked by the user.

The user like feature indicates user likes or user preferences, and may include: a user preference label indicating user likes, for example, a music type label liked by the user, a program label liked by the user, a music type label disliked by the user, and a program label disliked by the user.

The user dislike feature indicates a feature opposite to user likes or preferences, and may include: a music type label disliked by the user, and a program type label disliked by the user.

The historical behavior data may be behavior data for operating the multimedia device. For example, if the multimedia device randomly plays a rock, and user A is using the multimedia device, if the user dislikes the rock, the user may control the multimedia device to switch. The switching operation may be recorded as the historical behavior data. Then, a music type label disliked by the user may be determined based on a type of music selected by the user to play, and a music type label liked by the user may further be determined based on a type of music listened to by the user. In this embodiment, usually different users correspond to different second accounts, and the preference information corresponds to second accounts of user A.

In some embodiments, the user like feature and/or the user dislike feature may further be determined based on the user attribute information. The user attribute information may include: user feature information such as user ages, user genders, user occupations, user nations, and religions.

For example, a child may like cartoons, but may dislike various legal programs with strong logical analysis and coherence. In this way, the user like feature or the user dislike feature may be obtained according to user ages.

In this embodiment, a self-adaptive learning model such as vector machine or a neural network may be used to process at least one of the user historical behavior data and the user attribute information, to obtain the user like feature and/or the user dislike feature.

The providing the first service according to the preference information in step S160 may include at least one of the following:

obtaining, from the pre-determined system according to the user like feature, multimedia information of user likes of a second account currently used by the multimedia device;

recommending, according to the user like feature, the multimedia information of user likes to the second account currently used by the multimedia device;

blocking, according to the user dislike feature, multimedia information of user dislikes of the second account currently used by the multimedia device provided by the pre-determined system; and blocking, according to the user like feature, service recommendation of user dislikes of the second account currently used by the multimedia device provided by the pre-determined system.

The service provided by the pre-determined system has a service attribute, and the service attribute may be information such as a content label of service content in a service providing process, for example, a music type label in a music service, or an attribute label of an audio program in an audio program service.

The service attribute may be used for indicating a feature of a group or a user adaptive to a corresponding service. For example, if the current multimedia device is an intelligent TV, a TV program outputted by a current TV program service is a children cartoon, and obviously a service attribute of the children cartoon may be "children", the program is outputted as a recommended program, and can only be recommended to children or kids. If the program is recommended to adults or the aged, obviously recommendation information disturbances may be caused, and a click-through rate and precision of the recommendation may be reduced.

In this embodiment of the present disclosure, when the second service is obtained from the pre-determined system according to the preference information in step S160, a service attribute of a service that may be provided by the pre-determined system may be matched with the preference information, and a service whose service attribute has a high matching rate with the user like feature is selected as the first service according to a matching result, and/or a service whose service attribute has a high matching rate with the user dislike feature is blocked.

Usually, one second account is assigned for one user. In this way, a personalized service meeting a personalized requirement can be provided to the user according to the second account currently used by the multimedia device. The first service may be: obtaining, from the pre-determined system, a personalized service meeting a personalized requirement of the user of the second account currently used by the multimedia device.

If the method in this embodiment is used, the first service may be provided according to preference information of the second account of the user currently using the multimedia device, and personalized recommendation may further be implemented, to reduce information disturbances and implement more precise recommendation.

In some embodiments, the method further includes: obtaining, based on the first account, a second service provided to the second account by the pre-determined system. The second service may be for all second accounts. The second service is a service that is not provided selectively based on the user preference information of each second account. Therefore, from this level, the second service may be a general service or a basic service for all second accounts.

For example, after the audio device starts, the audio device receives an operation instruction of randomly playing an audio, and the audio device may use the first account to randomly obtain an audio from the pre-determined system and output the audio. Such an audio service is the second service. If the current audio device recognizes that the user is a user of a second account, an audio liked by the user is pulled selectively from the pre-determined system according to the user preference information and is output. This service is the first service that meets a personalized requirement of the user and that is selectively provided.

For another example, if the pre-determined system is a music system, the music system may provide a music service for the multimedia device, but provide, for each second account, a personalized service based on preference information corresponding to the second account. For example, if it is determined, based on the preference information, that a user of a second account likes rocks, when the second account is using the multimedia device, after the first account is used to log in to the pre-determined system, a first service of rock recommendation is provided on the basis of providing the second service.

In this embodiment of the present disclosure, the first service and the second service are different. For example, the first service and the second service are for different objects. The second service may be a service for all second accounts, and the first service is a service for a specific second account. For another example, the difference of the first service and the second service is embodied in different manners for determining service content. For example, the service content of the first service is determined according to the user preference information, and the second service may be a service actively pushed by a server, or may be a service directly requested by the user, but is unrelated to the user preference information. Behavior data of the first service requested by the user may be the user preference information generated by the user.

Figure 6:
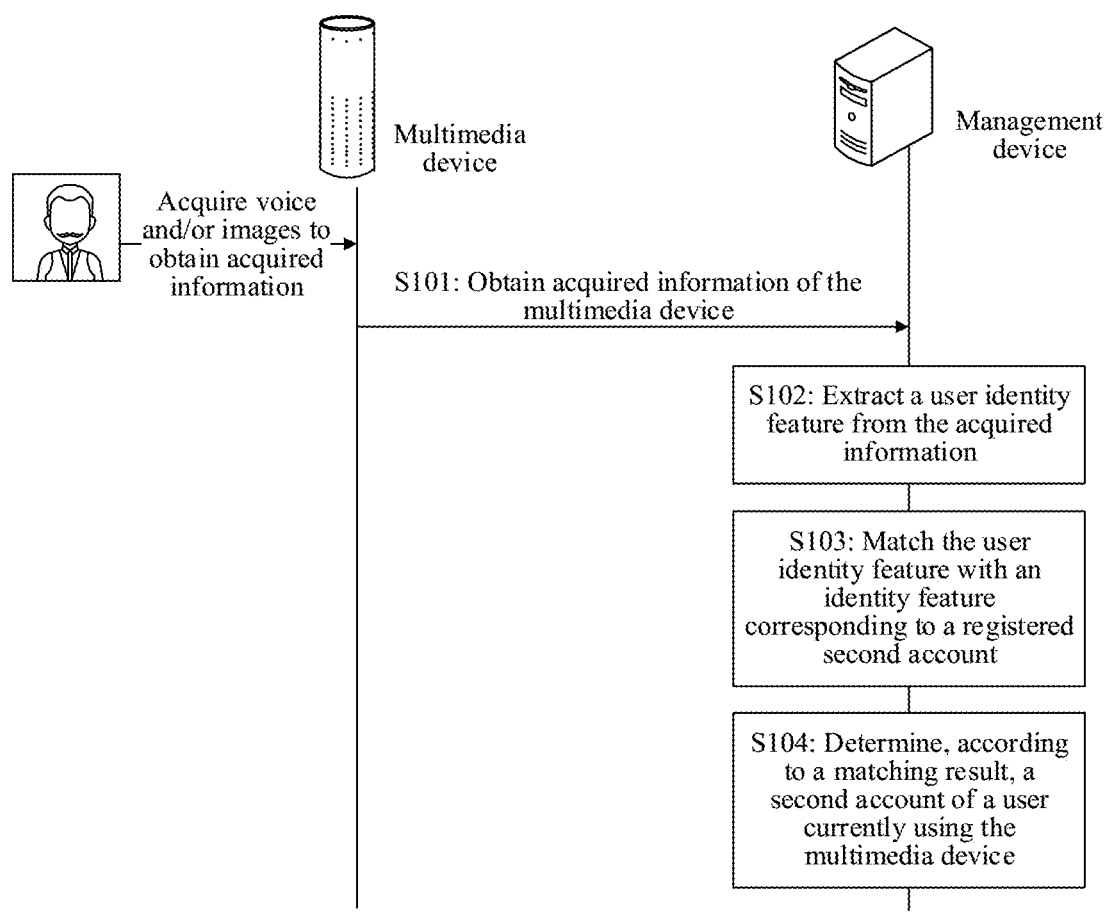
FIG. 6 is a first schematic flowchart for determining a second account according to an embodiment of the present disclosure.
Figure 7:
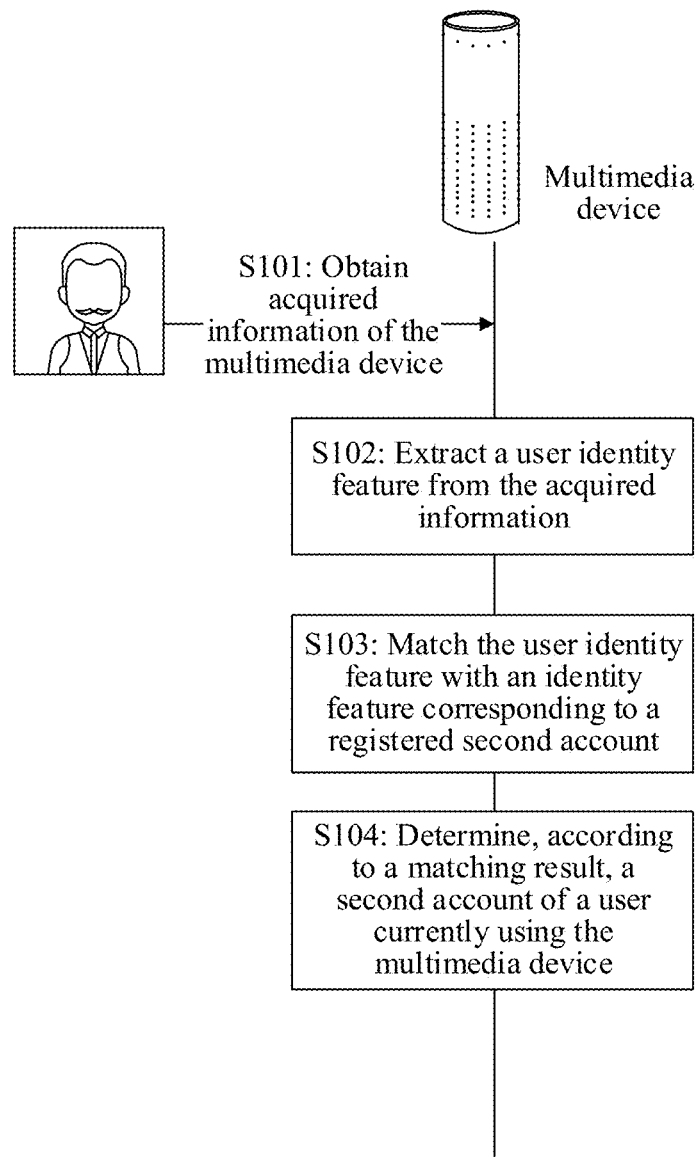
FIG. 7 is a second schematic flowchart for determining a second account according to an embodiment of the present disclosure.

Optionally, as shown in FIG. 6 or FIG. 7, the method further includes:

Step S101: Obtain acquired information of the multimedia device.

Step S102: Extract a user identity feature from the acquired information.

Step S103: Match the user identity feature with an identity feature corresponding to a registered second account.

Step S104: Determine, according to a matching result, a second account of a user currently using the multimedia device.

In this embodiment, the acquired information may be audio information, image information, or video information, and may further be auxiliary information acquired by other sensors. The auxiliary information may include: infrared information sensed by using an infrared sensor. The infrared information may provide temperature data to the current user, and the temperature data may be used as a type of data providing an identity feature of the current user.

In this embodiment, the user identity feature may be obtained by using the acquired information. In this embodiment, the user identity feature is in a one-to-one correspondence with the second account, and is used in an internal system such as the multimedia device or a management device of the multimedia device to recognize information of the second account corresponding to the user.

The internal system in FIG. 6 includes: the multimedia device and the management device. The multimedia device acquires information, and reports the information to the management device after acquiring the information. The management device completes recognition and matching of the user feature, and determines a second account corresponding to a user currently using a target account.

In some embodiments, as shown in FIG. 7, the multimedia device itself may also complete information acquisition, and perform feature matching to determine the corresponding second account.

Figure 8:
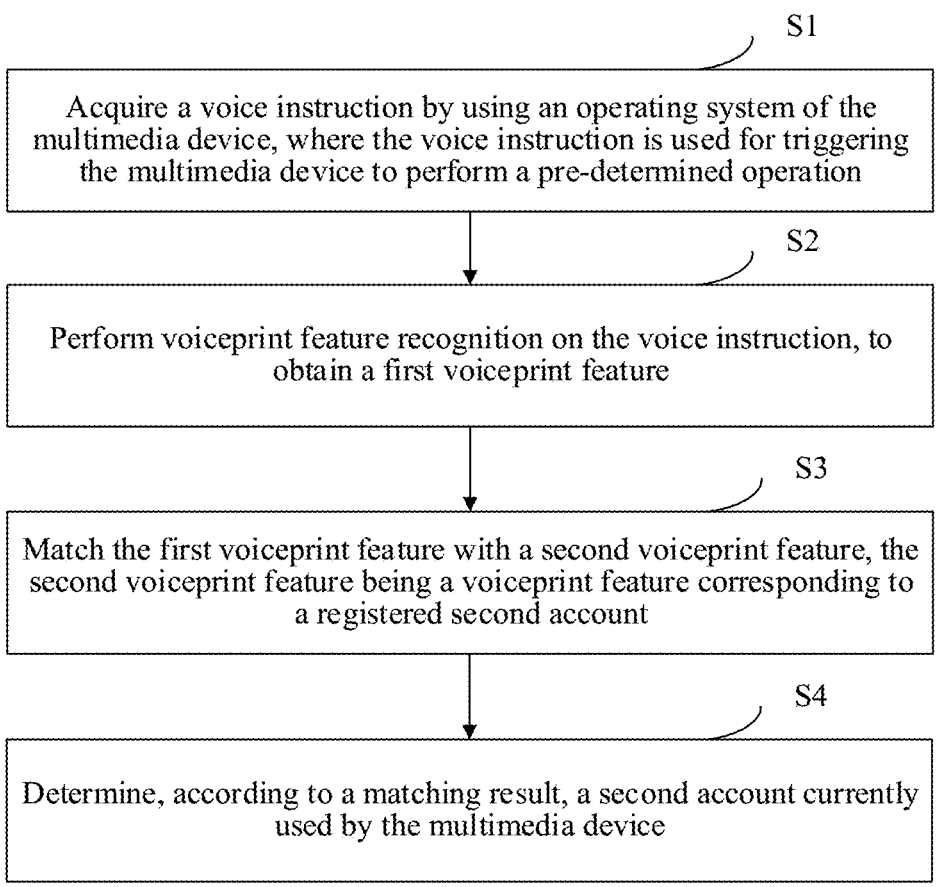
FIG. 8 is a schematic flowchart of another information processing method according to an embodiment of the present disclosure.

The user identity feature may be various features that can indicate user identities, such as a fingerprint feature and a specific behavior feature. The following provides several optional manners for obtaining the user identity feature:

Optional Manner 1:

As shown in FIG. 8, the method further includes:

Step S1: Acquire a voice instruction by using an operating system of the multimedia device, where the voice instruction is used for triggering the multimedia device to perform a pre-determined operation. The voice instruction acquired in the foregoing step S130 may be acquired by a voice acquisition APP of the multimedia device, or may be acquired by the operating system, and is acquired by the operating system of the multimedia device in this embodiment.

Step S2: Perform voiceprint feature recognition on the voice instruction, to obtain a first voiceprint feature.

Step S3: Match the first voiceprint feature with a second voiceprint feature, the second voiceprint feature being a voiceprint feature corresponding to a registered second account.

Step S4: Determine, according to a matching result, a second account currently used by the multimedia device.

An operating system is disposed in the multimedia device, and various applications are further installed on the basis of the operating system. In this embodiment, the voice instruction is acquired by using the operating system, instead of using a dedicated APP. In this way, the voice instruction of the user may be acquired as long as the operating system of the multimedia device is started, instead of waiting until the specific APP is started. Therefore, the solution provided in this embodiment of the present disclosure can reduce an acquisition delay of the voice instruction.

If the multimedia device is in a dormant status or the like, generally, to reduce power consumption of the multimedia device, many APPs are closed or in an inactivated status. If the voice instruction needs to be acquired by the APP, the APP needs to be started and remains an activated status, or otherwise, the APP cannot acquire the voice instruction, but the APP obviously consumes power for remaining the activated status. In this embodiment, the voice instruction may be directly acquired by using the operating system.

In this embodiment, the voice instruction may be an operation instruction that the user instructs the multimedia device to perform any operation. On one hand, a voiceprint feature of the voice instruction may be extracted to obtain a recognition feature for determining the second account currently used by the multimedia device. On the other hand, the voice instruction may further trigger the multimedia device to perform a corresponding operation in response to the voice instruction. Therefore, in some embodiments, the method further includes: performing the pre-determined operation in response to the voice instruction. For example, if the pre-determined operation is a music play operation, the audio device may switch from a status of not playing music to a status of playing music.

Voice of different users has different features. For example, different frequencies, timbres, and habitual voice loudness of different users may cause at least one of the frequency, timbre and loudness of audio information acquired by the multimedia device to be different. The information is reflected in the voiceprint feature, so that the voiceprint feature acquired by the multimedia device may be used to determine the second account corresponding to the user currently using the multimedia device.

Optionally, the pre-determined operation is different from an account registration operation. The account registration operation is an operation of performing a second account.

S4 may include: registering a new second account based on the first voiceprint feature in a case that the first voiceprint feature does not match the second voiceprint feature; and determining the registered new second account as the second account currently used by the multimedia device.

If it is currently detected that the first voiceprint feature does not match voiceprint features of all second accounts, it indicates that currently a new user is using the multimedia device. Therefore, an account registration process is automatically initiated based on the extracted first voiceprint feature, to register an exclusive second account of the current user. After a new second account is registered, a voiceprint feature extracted from the voice instruction and the registered new second account are stored correspondingly, so that when the user uses the multimedia device next time, the second account that the multimedia device currently needs to use may be determined by extracting and matching the voiceprint feature.

Optionally, the method further includes:

outputting registration prompt voice in a case that the first voiceprint feature does not match the second voiceprint feature;

acquiring registration answer voice; and registering a new second account based on the first voiceprint feature in a case that the registration answer voice indicates registering a new account.

In some cases, when a guest visits at home, the guest may be a new user that uses the multimedia device, and obviously, there is no need to re-register a new second account. To avoid overly registrations of second accounts with low use frequencies, in this embodiment, if it is detected that the first voiceprint feature does not match the second voiceprint feature, a registration voice prompt may be outputted, so that the user may hear an account registration prompt outputted by the multimedia device. The user may speak a registration answer according to a situation of the user, so that the multimedia device may acquire registration answer voice.

If the registration answer voice indicates registering a new account, a new second account is registered based on the first voiceprint feature, or otherwise, no new second account is registered. Therefore, unnecessary registrations of the second accounts with low use frequencies can be reduced.

Optionally, the method further includes: determining, in a case that the registration answer voice indicates not registering a new account, that the multimedia device is currently using a default second account to provide a multimedia service. If the registration answer voice of the user indicates not registering a new account, in order to continue to provide the multimedia service, a default second account is used to provide the multimedia service to the user, to improve use experience of the user.

In some embodiments, step S4 may further include:

determining, in a case that the first voiceprint feature matches the second voiceprint feature, that the multimedia device is currently using a second account corresponding to the first voiceprint feature to provide a multimedia service; and directly selecting, if it is currently detected that the first voiceprint feature matches a second voiceprint feature of a registered second account, the second account as the second account currently used by the multimedia device, so that the targeted first service may be provided in step S160.

Optionally, step S1 may include:

acquiring a status switching instruction by using the operating system of the multimedia device; and the performing the pre-determined operation in response to the voice instruction includes:

switching, by the multimedia device, from a first status to a second status according to the status switching instruction, where a power consumption of the multimedia device in the first status is lower than that in the second status.

In this embodiment, the status of the multimedia device may include: the first status and the second status, and the power consumption of the multimedia device in the first status is lower than that in the second status. That is, the first status is a low power consumption status, and the second status is a high power consumption status. If the first status may be a dormant status, the second status may be an activated status after a dormant status. If the first status is a closed status, the second status may be a started status.

Therefore, in some embodiments, the status switching instruction may be a start instruction of the multimedia device, and after detecting the start instruction, the multimedia device may enter the started status from the closed status. In the closed status, the multimedia device may acquire the voice instruction, but may not provide the multimedia service such as an audio service and/or a video service. In the started status, the multimedia device may not only acquire the voice instruction, but also provide the multimedia service.

Therefore, in some other embodiments, the status switching instruction may further be an activated instruction of the multimedia device. Although the multimedia device is not closed in the dormant status, a processor (for example, a central processing unit) of the multimedia device in the dormant status cannot respond to many operations, or cannot provide the multimedia service. However, after the processor enters the activated status from the dormant status, functions of the multimedia device can all be activated, and the multimedia service can be provided.

In some embodiments, step S1 may include: acquiring a service obtaining instruction by using the operating system of the multimedia device. In this embodiment, the service obtaining instruction is an instruction for obtaining the multimedia service, for example, instructing the multimedia device to obtain an audio and play the audio.

The method further includes:

switching, by the multimedia device, from a first status to a second status according to the service obtaining instruction, where a power consumption of the multimedia device in the first status is lower than that in the second status; and the performing the pre-determined operation in response to the voice instruction includes:

providing a multimedia service based on the currently used second account according to the service obtaining instruction after switching to the second status.

The service obtaining instruction not only may trigger the multimedia device to provide the multimedia service, but also may trigger the multimedia device to enter the second status from the first status, and then provide the multimedia service in the second status. In this way, the user may trigger the status switching of the multimedia device and providing of the multimedia service by using a service obtaining instruction, thereby obviously reducing a quantity of instructions that the user needs to provide, and simplifying user operations.

For example, in a home theater device, video programs liked by father and daughter may be completely different. The father is watching a military show at the beginning and leaves halfway, and the daughter enters the living room to control the home theater device by using voice to switch to a variety program related to beauty and skincare. Obviously, switching of a watching user occurs. In this case, when switching a watched program, if the daughter uses voice control, the home theater device may acquire a corresponding voice instruction; and voiceprint features extracted from voice instructions of the father and the daughter are obviously different. If the daughter speaks a voice instruction other than "switch a channel", the voiceprint feature of the daughter may be extracted from the voice instruction, and it is switched from the second account of the father to the second account of the daughter according to voiceprint feature matching, and preference information of the daughter is queried for. The preference information indicates that the daughter may like an interest label of beauty and skincare. According to the found interest label, the video device may automatically switch to a beauty program liked by the daughter. Even if the daughter does not speak switching to that program, the video device may automatically switch to her liked channel according to the preference information of the daughter.

Optional Manner 2:

step S101 may include:

extracting an appearance feature from image information.

The appearance feature is generally a visual feature of an appearance of the user, and may be obtained by acquiring an image, for example, a facial feature of the user. The facial feature may further be classified into: a facial outline feature, a facial shape feature, a facial distribution feature, an iris feature, a hairline height, a hair style and/or a hair color. The appearance feature may be one or more of the foregoing features.

Some appearance features such as the hair style and the hair color are easily changed, and in this embodiment, facial features that are not easily changed are used as features for recognizing the second account.

In some embodiments, the appearance feature may further include: a user body feature or the like.

Optional Manner 3:

Step S101 may further include:

extracting a user pronunciation feature from voice information, where different users have different pronunciation features, for example, accents of speaking some words. In this way, the second account corresponding to the user currently using the multimedia device may further be determined according to the user pronunciation feature.

Optional Manner 4:

Step S101 may further include:

parsing voice information acquired by the multimedia device, and extracting indication information referring to a specific second account from the voice information. For example, if user A speaks the name of user A, the name corresponds to the corresponding second account. Obviously, the second account of the user may also be determined according to this manner.

Optional Manner 5:

Step S101 may further include:

using the multimedia device to dispose a separated or connected control device, where different users operate the control terminal in different manners, such as the strength of pressing entity keys, or acquiring user fingerprints by using keys combined with a fingerprint acquisition function, to determine the second account by using the user fingerprints.

Optional Manner 6:

Step S101 may further include:

using an infrared sensor and the like to acquire user temperature, and/or, using an intelligent device that is connected to the multimedia device and that is carried around by the user, to acquire heartbeat information and other various information that can indicate the user identity, to obtain the user identity feature.

During specific implementation, a plurality of types of acquired information may be used for obtaining the user identity feature, and it is not limited to any one of the foregoing. During specific implementation, to implement precise recognition of the user identity feature, any two or more types of the foregoing acquired information may be combined.

Correspondingly, step S102 may include: using one or more user identity features in step S101 to match with features corresponding to the second account, to obtain a matching result such as a corresponding matching rate, and then determining, in combination with the matching result, the second account corresponding to the user currently using the multimedia device. For example, step S102 may include at least one of the following: matching the voiceprint feature with voiceprint features corresponding to the second accounts; and matching the appearance feature with appearance features corresponding to the second accounts.

Therefore, in this embodiment, the voiceprint feature and the appearance feature may be obtained at least in combination with the audio information, and the second account of the user currently using the multimedia device may be determined by using one or two of the voiceprint feature and the appearance feature as the user identity feature.

In some embodiments, the acquired information may further be image information. For example, when mother enters the living room, she may use a control device such as a remote control or a wireless mouse to control the home theater device to switch the program on the air. The image information is obtained through real-time image acquisition by using an image acquisition apparatus (such as a camera) included in the multimedia device or a camera connected to the multimedia device or through scope acquisition for a visible region of the multimedia device when a control instruction transmitted by the control device is detected. The appearance feature is determined through the image information extraction, and the current user currently using the multimedia device and the corresponding account may be determined based on the appearance feature. In this embodiment, if a plurality of pictures including portraits is acquired, which portrait's appearance feature is extracted may be determined only according to a position relationship between the control device and the portrait. For example, only an appearance feature of a portrait holding the multimedia device is extracted, or only an appearance feature of a portrait closest to the control device may be extracted.

In conclusion, in this embodiment, voiceprint feature extraction may be performed on each piece of audio information of voice for controlling the multimedia device to perform an operation, or when a control instruction transmitted by a control device is detected, image information or other auxiliary information that helps identity recognition may be acquired, to extract a user identity feature to determine a second account corresponding to each user input, and precisely obtain behavior data of the user, to precisely obtain preference information, thereby facilitating precise push and/or recommendation of a personalized service subsequently. Herein, the push is directly providing services different from others to the corresponding user, and the recommendation is displaying recommendation information of the personalized service on an interface of the second account of the user, or outputting recommendation information by using voice.

Optionally, the method further includes:

recording the user identity feature if both the user identity feature and an identity feature corresponding to an existing second account do not meet a preset matching condition; and registering a second account based on the user identity feature.

In this embodiment, if it is detected that the corresponding user identity feature and identity features of all the existing second accounts do not meet the preset matching condition, for example, matching rates with the identity features of all the existing second accounts are lower than a threshold, it may be regarded that currently a new user is using the multimedia device, and a new second account needs to be established. In this case, the multimedia device or the management device connected to the multimedia device re-assigns a second account to the user, and establishes a correspondence between the assigned second account and the user identity feature, which is used for recognizing the user when the user uses the multimedia device next time, and starting the second account corresponding to the user to provide a personalized service.

In some embodiments, the second account is classified into two types, one is a temporary second account, and the other is a formal second account. In this embodiment, when a user identity feature that does not match an identity feature of any second account (including: a formal second account and a temporary second account) is detected for the first time, a temporary second account is established; and use status information such as the used times and/or frequencies of the second account is recorded. When the use status information meets a conversion condition within a pre-determined time, the temporary second account is converted to the formal second account. For example, the conversion condition is met when login times of the temporary second account reach pre-determined times within a pre-determined time, or login frequencies reach pre-determined frequencies, and the temporary second account is determined as the formal second account. If the conversion condition is not met within the pre-determined time, the temporary second account is deleted.

In some embodiments, the multimedia service may include: a free service provided without a charge and a charged service provided when a charge is needed. For example, in this embodiment, a service provided for a default second account may be the free service.

In some other embodiments, the multimedia service is classified into a plurality of levels, for example, a restricted level and an unrestricted level. Some service content such as video content or audio content may involve problems such as violence, and is not suitable for children to watch. Such content may be set as service content of a restricted service. In this embodiment, the second service provided to the default second account may be the unrestricted general service.

Therefore, in some embodiments, the method further includes: determining a permission scope of the second account; and providing the first service to the corresponding second account according to the permission scope.

In this embodiment, the permission scope of the second account may further be set. The permission scope limits scopes such as types and/or attributes of multimedia services that may be obtained by the corresponding second account.

For example, if account A is a second account of a child at home, some restricted video programs and/or audios involving violence are obviously not suitable for being used by the second account. Therefore, in this embodiment, a permission of forbidding the use of restricted multimedia services is configured for the second account.

The configuring a permission scope of the second account may include:

determining the permission scope according to a user attribute of the second account, for example, setting different permission scopes for second accounts of children and adults respectively according to user ages.

For another example, the permission scope of the second account is determined according to psychological situation information of users. Some users have psychological traumas or psychological illnesses, and some videos and/or audios are not suitable for them to watch. In this case, the multimedia device or its management device may automatically configure the permission scope according to the psychological situation information, to block multimedia services that are not suitable for being obtained by such type of users. For charged services and free services, for example, the permission scope of second accounts of teenagers may be set as free services according to user ages, and the permission scope of second accounts of adults includes: a charged service and a free service.

Therefore, step S150 may include: obtaining, in a case that the permission scope of the second account is a first permission scope, the first service in the first permission scope from the pre-determined system by using the first account; and obtaining, in a case that the permission scope of the second account is a second permission scope, the first service in the second permission scope from the pre-determined system by using the first account, where the first permission scope is greater than the second permission scope.

In some embodiments, the method further includes: receiving a configuration instruction, where the configuration instruction is provided by the second account whose permission scope is the first permission scope; and configuring the second permission scope based on the configuration instruction.

In this way, the permission scope of the second account may be distinguished by setting the permission scope, and the second account with a larger permission scope may configure the permission scope of the second account with a smaller permission scope. For example, if the multimedia device is a home sharing device, the parents may use their own second accounts with larger permission scope to configure the permission scope of second accounts of the children.

By configuring the permission scope, whether the first account may be used to purchase a charged service in the permission scope may be limited.

When a user identity feature that does not match an identity feature of an existing second account is detected, a new second account is actively registered, which is an active registration mode for the second account of the multimedia device. In some cases, the multimedia device or the management system in which the multimedia device is located, such as the management device of the multimedia device, further provides a passive registration mode. The passive registration mode is: The multimedia device detects a registration instruction inputted by the user, and performs a registration process of a second account based on the registration instruction. For example, the method further includes: obtaining acquired information of the multimedia device when detecting the registration instruction; extracting a user identity feature from the acquired information; and registering a second account based on the user identity feature.

In this embodiment, a human-machine interaction interface of the multimedia device is used to detect the registration instruction. The human-machine interaction interface herein may include: an apparatus and a structure that may detect a user input, such as a voice acquisition apparatus, a touch panel, a remote control, a wireless mouse, or a visual recognition system of the multimedia device. When detecting the registration instruction, the human-machine interaction interface triggers the multimedia device itself or the management device connected to the multimedia device to assign a new second account, to complete the registration process of the second account. In this embodiment, during registration of the second account, a new user identity feature needs to be acquired. Therefore, the multimedia device may acquire information of a new user, for example, acquire voice of the new user, and acquire images of the new user, so as to extract the user identity feature from the acquired information, to establish a correspondence with the assigned new second account.

In this way, the second account may be actively registered and may be passively registered, and different registration requirements may be met, to improve use satisfaction of the user and intelligence of the internal system as much as possible.

In some embodiments, the method further includes at least one of the following:

recording user behavior data according to the second account;

configuring an application mode of the multimedia device, a use permission of the multimedia device, an application permission of using the first account, and an account priority according to preference information corresponding to the second account, where output parameters of different application modes are different; and the account priority is used for providing a selection basis for determining a final configuration parameter to the target account when configurations of different second accounts for the multimedia device conflict; and correspondingly recording pre-determined information according to the second account, where the pre-determined information includes: memos and/or schedule information.

In this embodiment, when the user behavior data is recorded, one multimedia device used by different users may use different second accounts to separately record user behavior data, to obtain, based on the user behavior data, the preference information corresponding to the second account.

In this embodiment, the application mode of the multimedia device is configured. The application mode herein may include: an output parameter and/or an output style. For example, when the multimedia device is an audio output device, different users like different timbres, and are used to different output volumes, and these parameters may all be set as default output parameters in the application mode. The style of a song may be a rock or a ballad, which may be embodied in the output style. The output style is also a parameter in an output mode. If the output style of the application mode of the second account corresponding to user A is configured as a rock, when a song has a rock version and a non-rock version, the rock version is output preferentially, to provide the personalized service to the user.

For example, when the multimedia device is a video output device (such as a TV set or a home theater), the application mode may include: a display interface style, a control interface style, and a hue or color temperature parameter of the video output device, to provide personalized services of different users corresponding to different second accounts, to meet their personalized requirements.

For the use permission of the multimedia device, the use permission herein may include: upgrading a system of the multimedia device, changing a first account bound with the multimedia device, modifying a second account corresponding to the first account bound with the multimedia device, and the like. Different second accounts have different use permissions of the multimedia devices, to help control the use of the multimedia device by using the second accounts. For example, one first account includes second accounts at two levels; and the use permission of the multimedia device may include: a first level use permission and a second level use permission. When the second account is a first level second account, the second account has a first level use permission; when the second account is a second level use permission, the second account has a second level use permission; and the second level use permission is less than the first level use permission, and is included in the first level use permission.

The first account is an account used in the multimedia device to connect to the external system. In this embodiment, when different second accounts use the first account to connect to the external system, the second accounts have different application permissions. For example, some second accounts cannot use the first account to purchase a charged service, or can only purchase a charged service not exceeding a pre-determined amount. Some second accounts may not modify some setting parameters of the first account, for example, whether a payment password is needed during purchase of a charged service, or modifying a payment account bound with the first account.

In this embodiment, the second accounts have different account priorities. For example, if two second accounts both have some application permissions of the multimedia device or the first account, the application permissions may be permissions set with parameters provided by the multimedia service of the multimedia device, and once set, the permissions are effective to all second accounts or effective to some second accounts. In this case, the settings of the two second accounts may conflict. In this embodiment, the multimedia device or the management device of the multimedia device selects setting parameter of a second account with a high account priority as a final setting parameter according to the account priority, to control running of the multimedia device.

For example, a home theater includes second accounts of parents and second account of children, and whether the multimedia device automatically receives a piece of information may be set. Account priorities of the second accounts of the parents are higher than priorities of the second accounts of the children, to facilitate distinguishing account priorities, and help the second accounts of the parents to control the second accounts of the children. For example, the second accounts of the parents are used to configure types of audio programs that the second accounts of the children may listen to or types of video programs that the second accounts of the children may watch. If in this case, permission settings of the second accounts of the parents for the second accounts of the children just conflict with the settings of the second accounts used by the children, it is subject to the settings of the second accounts of the parents.

In some embodiments, the multimedia device or the management device of the multimedia device may generate the pre-determined information based on the user input or the user indication. The pre-determined information herein may be memos and schedule information. For example, the multimedia device or the management device of the multimedia device automatically generates schedule information according to habits of the user in using the multimedia device. In this case, if one multimedia device is shared by a plurality of users, and only one piece of schedule information is generated, obviously which user the schedule information belongs to cannot be precisely reflected, or a problem of a schedule conflict may occur. Likewise, if memos are recorded not according to users, a conflict problem may also be caused. In this embodiment, because one first account is correspondingly set with a plurality of second accounts, and these second accounts correspond to different users, pre-determined information such as schedule information and memos may be respectively recorded based on the second accounts, so as to conveniently resolve the information conflict, to further reduce system exceptions or device execution exceptions caused by the information conflict.

Optionally, step S160 may include at least one of the following:

providing recommendation information to the second account according to preference information corresponding to the second account, where the recommendation information is used for the multimedia device to output; and selecting a corresponding application mode for the second account according to the preference information corresponding to the second account, where the multimedia device provides a service to the corresponding second account in the application mode.

During service recommendation, targeted recommendations are needed, or otherwise, recommendation information may be an information disturbance to the user, and recommendation precision is low. In this embodiment, precise recommendation can be performed based on the preference information of the second account, thereby reducing information disturbances, and improving recommendation precision.

In some embodiments, application modes are set according to the preference information, and different application modes have different output parameters and/or output styles, which are obviously only for specific second accounts, and obviously the personalized service is implemented. The personalized service herein may include: adjusting a display position of output information on an audio output selection page or a video output selection page based on the preference information. For another example, an interactive mode with the user is adjusted. The interactive mode herein may be one of application modes.

For example, children and adults need different types of voice feedback mechanisms. Adults generally hope voice feedback to be simple and direct, and children have more sentiment requirements, and do not like rigid tones. Therefore, in this embodiment, different second accounts may be used to configure different voice interactive modes respectively for adults and children, so that when the user is an adult, the voice interaction is simple and clear, and when the user is a child, the voice interaction has more guidance, and close female voice is preferentially used to output the voice feedback and the like.

Certainly, the foregoing is merely for example. During specific implementation, there may be various different manners. In this embodiment, for a plurality of users sharing one multimedia device, a plurality of second accounts of a first account corresponding to the multimedia device is set respectively, to respectively provide a personalized service in an internal system based on the second accounts. Then, the plurality of second accounts sharing one first account is connected to an external system to obtain a general service or a basic service provided by the external system.

Figure 9:
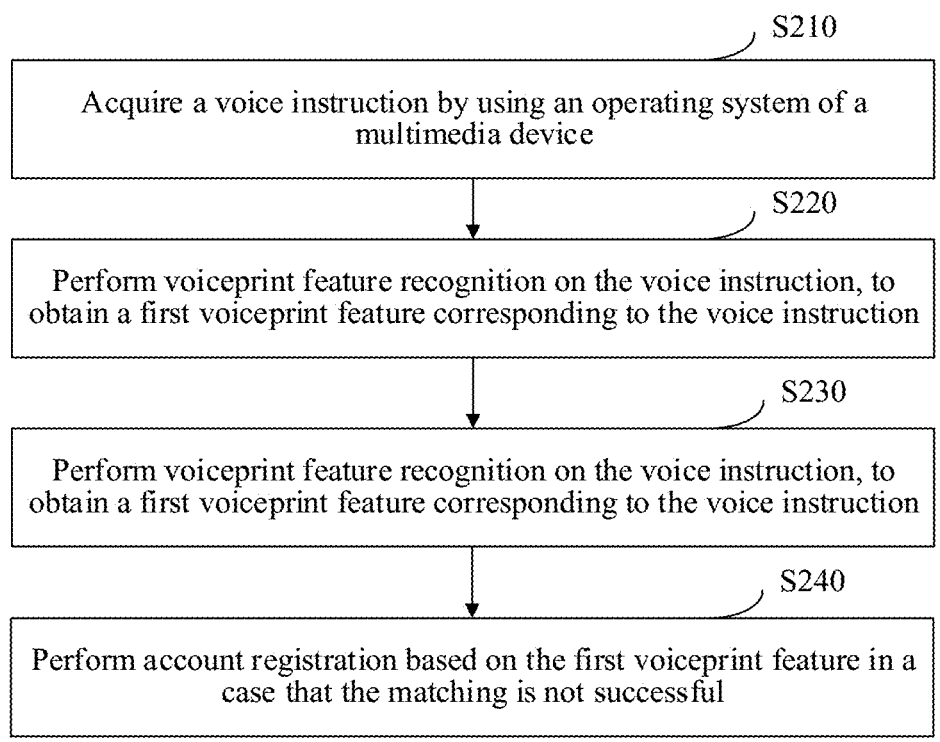
FIG. 9 is a schematic flowchart of another information processing method according to an embodiment of the present disclosure.

As shown in FIG. 9, this embodiment provides an information processing method, including:

Step S210: Acquire a voice instruction by using an operating system of a multimedia device, the voice instruction being used for triggering the multimedia device to perform a pre-determined operation, and the pre-determined operation being different from an account registration operation.

Step S220: Perform voiceprint feature recognition on the voice instruction, to obtain a first voiceprint feature corresponding to the voice instruction.

Step S230: Match the first voiceprint feature with a second voiceprint feature, the second voiceprint feature being a voiceprint feature corresponding to a registered account.

Step S240: Perform account registration based on the first voiceprint feature in a case that the matching is not successful.

This embodiment further provides an information processing method of an account registration. Likewise, the voice instruction is acquired by using the operating system, and an account corresponding to the voiceprint feature is registered through voiceprint feature recognition. The account herein may be the first account and/or the second account. In this way, subsequently, a user currently using the multimedia device may be recognized through the voiceprint feature extraction, and the corresponding account is used to provide a service.

Optionally, step S240 may include: outputting registration prompt voice if the matching is not successful; acquiring registration answer voice; and performing account registration based on the first voiceprint feature in a case that the registration answer voice indicates performing account registration.

Optionally, the method further includes: determining, in a case that the registration answer voice indicates not performing account registration, that the multimedia device uses a default account to provide a multimedia service.

Optionally, the method further includes: configuring, for the registered account, a permission scope of using the multimedia device. For the configuration of the permission scope, reference may be made to the corresponding part in the foregoing embodiments, and it is not described herein again.

Optionally, the permission scope includes: a first permission scope and a second permission scope; the first permission scope is greater than the second permission scope; and the method further includes: acquiring a configuration instruction of an account of the first permission scope; and determining the second permission scope based on the configuration instruction.

In some embodiments, step S210 may include: acquiring a status switching instruction by using the operating system of the multimedia device; and the performing the pre-determined operation in response to the voice instruction includes: switching, by the multimedia device, from a first status to a second status according to the status switching instruction, where a power consumption of the multimedia device in the first status is lower than that in the second status. For description of the first status and the second status herein, reference may be made to the foregoing embodiments.

Optionally, step S210 may further include: acquiring a service obtaining instruction by using the operating system of the multimedia device; and the method further includes: switching, by the multimedia device, from a first status to a second status according to the service obtaining instruction, where a power consumption of the multimedia device in the first status is lower than that in the second status; and providing a multimedia service based on the currently used second account according to the service obtaining instruction after switching to the second status.

Figure 10:
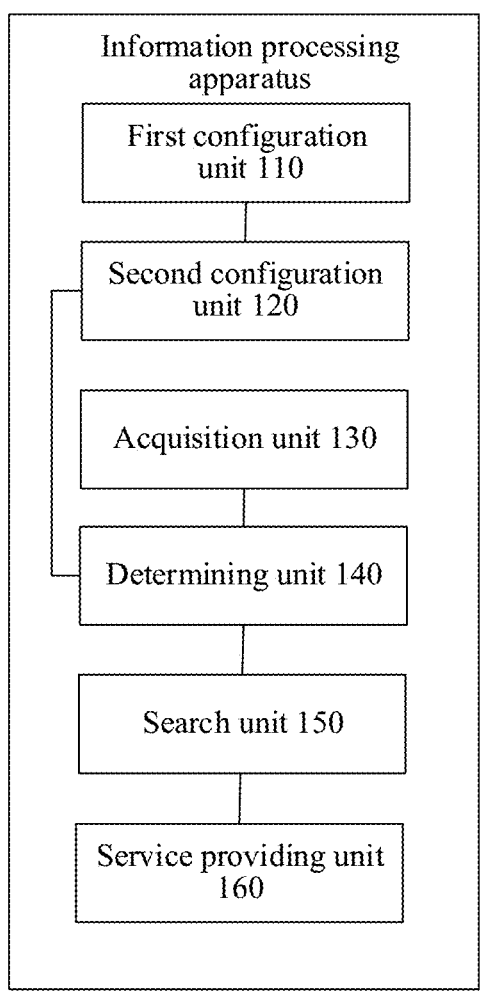
FIG. 10 is a schematic structural diagram of a multimedia device according to an embodiment of the present disclosure.

As shown in FIG. 10, the embodiments of the present disclosure further provide an information processing apparatus, including:

a first configuration unit 110, configured to configure at least one first account for a multimedia device;

a second configuration unit 120, configured to configure a plurality of second accounts for the multimedia device, the plurality of the second account being associated with the at least one first account;

an acquisition unit 130, configured to acquire a voice instruction;

a determining unit 140, configured to determine a currently used second account according to the voice instruction;

a search unit 150, configured to search for user preference information associated with the currently used second account; and a service providing unit 160, configured to provide, based on the user preference information and service request information determined based on the voice instruction, a first service to the user identifier represented by the currently used second account.

In this embodiment, the first configuration unit 110, the second configuration unit 120, the determining unit 140, the search unit 150, and the service providing unit 160 may all correspond to a processor or a processing circuit. The processor may correspond to an application processor (AP), a central processing unit (CPU), a digital signal processor (DSP), a field programmable gate array (FPGA), or a micro processing unit (MCU). The processing circuit may correspond to an application specific integrated circuit (ASIC).

The processor or processing circuit may configure the second account and the first account by executing computer executable code such as a computer program.

In some embodiments, the service providing unit 160 is configured to obtain, based on the first account, a second service provided to the second account by the pre-determined system.

The acquisition unit 130 may correspond to a component for acquiring audio, such as a microphone, and may be configured to acquire a voice instruction by using an operating system of the multimedia device. The voice instruction is used for triggering the multimedia device to perform a pre-determined operation.

The determining unit 140 may include:

a recognition subunit, configured to perform voiceprint feature recognition on the voice instruction, to obtain a first voiceprint feature;

a matching subunit, configured to match the first voiceprint feature with a second voiceprint feature, the second voiceprint feature being a voiceprint feature corresponding to a registered second account;

a determining subunit, configured to determine, according to a matching result, a second account currently used by the multimedia device; and a performing unit, configured to perform the pre-determined operation in response to the voice instruction.

Optionally, the pre-determined operation is different from an account registration operation; and the multimedia device further includes:

a registration unit, configured to register a new second account based on the first voiceprint feature in a case that the first voiceprint feature does not match the second voiceprint feature; and a determining subunit, configured to determine the registered new second account as the second account currently used by the multimedia device.

Optionally, the multimedia device further includes:

an output unit, configured to output registration prompt voice in a case that the first voiceprint feature does not match the second voiceprint feature.

The acquisition unit is further configured to acquire registration answer voice.

The registration unit is configured to register a new second account based on the first voiceprint feature in a case that the registration answer voice indicates registering a new account.

Optionally, the determining subunit is further configured to determine, in a case that the registration answer voice indicates not registering a new account, that the multimedia device is currently using a default second account to provide a multimedia service.

Optionally, the determining subunit is further configured to determine, in a case that the first voiceprint feature matches the second voiceprint feature, that the multimedia device is currently using a second account corresponding to the first voiceprint feature to provide a multimedia service.

The acquisition unit is configured to acquire a status switching instruction by using the operating system of the multimedia device; and the performing unit is configured to switch, by the multimedia device, from a first status to a second status according to the status switching instruction, where a power consumption of the multimedia device in the first status is lower than that in the second status.

The acquisition unit is configured to acquire a service obtaining instruction by using the operating system of the multimedia device; the switching unit is configured to switch, by the multimedia device, from a first status to a second status according to the service obtaining instruction, where a power consumption of the multimedia device in the first status is lower than that in the second status; and the performing unit is configured to provide a multimedia service based on the currently used second account according to the service obtaining instruction after switching to the second status.

Optionally, the information processing apparatus further includes:

a third configuration unit, configured to configure a permission scope for the second account.

The service providing unit 160 is configured to provide the first service to the corresponding second account according to the permission scope.

The service providing unit 160 is configured to obtain, in a case that the permission scope of the second account is a first permission scope, the first service in the first permission scope from the pre-determined system by using the first account; and obtain, in a case that the permission scope of the second account is a second permission scope, the first service in the second permission scope from the pre-determined system by using the first account, where the first permission scope is greater than the second permission scope.

Optionally, the third configuration unit is configured to receive a configuration instruction, where the configuration instruction is provided by the second account whose permission scope is the first permission scope; and configure the second permission scope based on the configuration instruction.

Figure 11:
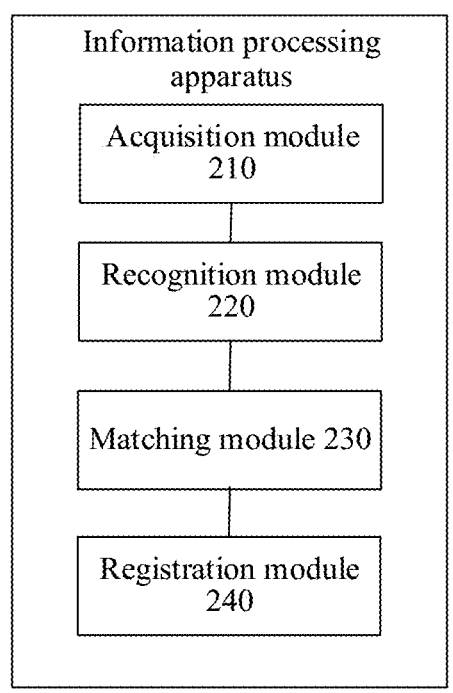
FIG. 11 is a schematic structural diagram of another multimedia device according to an embodiment of the present disclosure.

As shown in FIG. 11, this embodiment provides an information processing apparatus, including:

an acquisition module 210, configured to acquire a voice instruction by using an operating system of a multimedia device, the voice instruction being used for triggering the multimedia device to perform a pre-determined operation, and the pre-determined operation being different from an account registration operation;

a recognition module 220, configured to perform voiceprint feature recognition on the voice instruction, to obtain a first voiceprint feature corresponding to the voice instruction;

a matching module 230, configured to match the first voiceprint feature with a second voiceprint feature, the second voiceprint feature being a voiceprint feature corresponding to a registered account; and a registration module 240, configured to perform account registration based on the first voiceprint feature in a case that the matching is not successful.

The acquisition module may correspond to an acquisition component such as a microphone, may acquire audio information, and may be configured to acquire the voice instruction.

The recognition module, the matching module, and the registration module may correspond to a processor, and may perform operations such as voiceprint feature recognition and account registration by using a computer program and the like.

The multimedia device further includes:

an output module, configured to output registration prompt voice if the matching is not successful.

The acquisition module is further configured to acquire registration answer voice.

The registration module is further configured to perform account registration based on the first voiceprint feature in a case that the registration answer voice indicates performing account registration.

The multimedia device further includes:

a determining module, configured to determine, in a case that the registration answer voice indicates not performing account registration, that the multimedia device uses a default account to provide a multimedia service.

The multimedia device further includes:

a third configuration module, configured to configure, for the registered account, a permission scope of using the multimedia device.

Optionally, the permission scope includes: a first permission scope and a second permission scope; the first permission scope is greater than the second permission scope; the acquisition module is further configured to acquire a configuration instruction of an account of the first permission scope; and the third configuration module is configured to determine the second permission scope based on the configuration instruction.

The acquisition module is configured to acquire a status switching instruction by using the operating system of the multimedia device; and the multimedia device further includes:

a performing module, configured to switch, by the multimedia device, from a first status to a second status according to the status switching instruction, where a power consumption of the multimedia device in the first status is lower than that in the second status.

The acquisition module is configured to acquire a service obtaining instruction by using the operating system of the multimedia device; the multimedia device further includes: a switching module; the switching module is configured to switch, by the multimedia device, from a first status to a second status according to the service obtaining instruction, where a power consumption of the multimedia device in the first status is lower than that in the second status; and the performing module is configured to provide a multimedia service based on the currently used second account according to the service obtaining instruction after switching to the second status.

Figure 12:
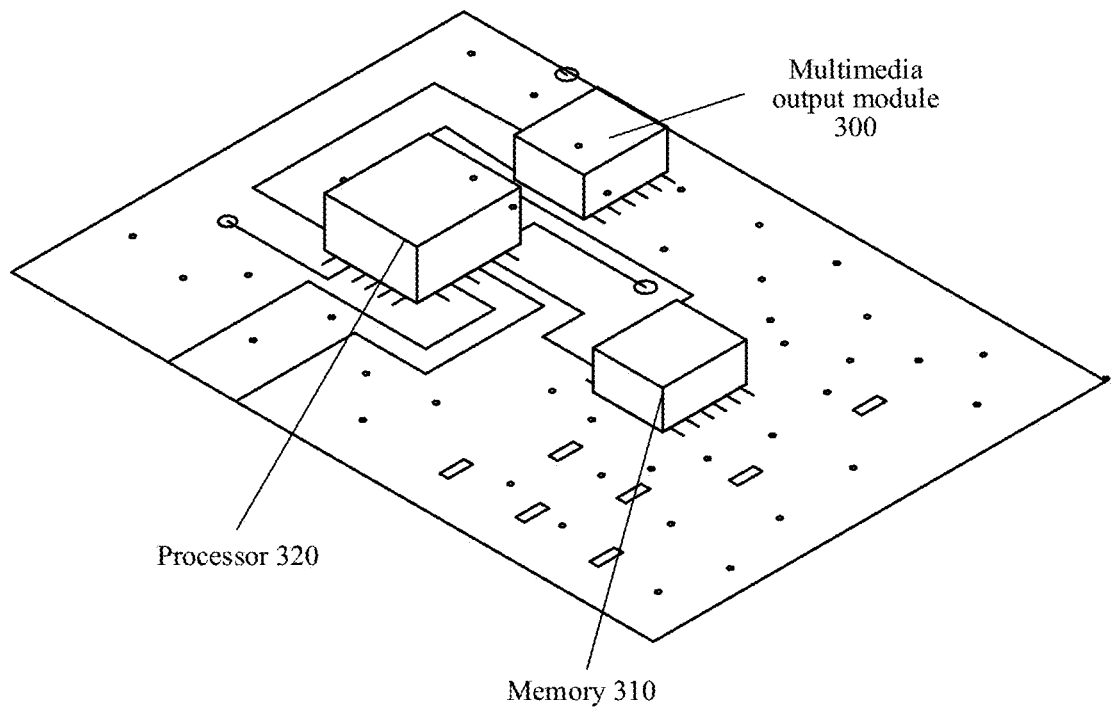
FIG. 12 is a schematic structural diagram of a multimedia device or a management device according to an embodiment of the present disclosure.

As shown in FIG. 12, this embodiment provides a multimedia device, including:

a multimedia output module 300, configured to output multimedia information;

a memory 310, configured to store data; and a processor 320, connected to the memory 310 and the multimedia output module 300, and configured to execute a computer program stored in the memory 310 to implement the information processing method provided in one or more of the foregoing technical solutions, for example, one or more of the information processing methods shown in FIG. 1, FIG. 6, FIG. 7, FIG. 8, and FIG. 9.

The multimedia output module 300 may include: a structure that may output an audio, such as a speaker or a loudspeaker, and may further include: a component that may output an image, such as a display screen. In conclusion, the media output module 300 in this embodiment may be various modules or components that can output multimedia information.

In this embodiment, the memory 310 may be various computer storage mediums. The computer storage medium may be configured to store various data. For example, the computer program further stores various data such as a second account, a first account, preference information, and a user identity feature in some embodiments.

In this embodiment, the processor 320 may be connected to the memory 310 through a bus interface such as an integrated circuit bus, and may execute the computer program to implement the information processing method provided in one or more of the foregoing technical solutions.

This service providing system can only provide, based on one first account, precise personalized services to a plurality of users sharing one multimedia device, to improve system intelligence and use satisfaction of the users.

Optionally, the embodiments of the present disclosure further provide a computer storage medium. The computer storage medium stores computer executable instructions, and the computer executable instructions are used for performing the service method provided in any one or more of the foregoing technical solutions.

The computer storage medium may include: various mediums that can store program code, such as a removable storage device, a read-only memory (ROM), a random access memory (RAM), a magnetic disk, or an optical disc, and is optionally a non-transient storage medium.

The following provides several specific examples with reference to any one of the foregoing embodiments.

Example 1

This example provides a personalized information processing method applied to a multimedia device. To provide a personalized service (namely, a first service), an intelligent speaker is generally bound with one first account (such as an Amazon account). For an external system, all interactions with the speaker are regarded as behaviors of the same user. The speaker is focused on a home application scenario, and parents and children in family members have great preference differences (for example, preferences of adults and children for music) and very different requirements (children have more chatting needs). Because family members cannot be distinguished in the existing solutions, a precise personalized service cannot be provided to each member, causing poor entire user experience.

This example provides a personalized service providing solution based on voiceprint recognition (VPR). Specifically, for each speaker, a plurality of family members registers second accounts, and the plurality of second accounts form a second account system. When a user is using the speaker, the speaker automatically recognizes different family members by using a VPR technology, and provides personalized services to the family members by using the second accounts corresponding to the family members, to provide more detailed and more precise personalized services.

The first account: bound with the speaker, to identify a dedicated or third-party account of a speaker identity (for example, a WeChat number, a QQ number, or a JDcom account may be used as the first account to connect to the external system).

The second account: After the speaker is bound with the first account, the second accounts that are generated separately for family or team members and that are applied to a multimedia service system in which the intelligent speaker is located, to distinguish different users of the speaker. A plurality of second accounts may correspond to one first account simultaneously, or may correspond to different first accounts (namely, the speaker is bound with a plurality of first accounts simultaneously).

VPR is also called speaker recognition, and is a technology of using speaker voice to automatically recognize a speaker identity.

Registration: In VPR, the user needs to provide voice data with some duration, as a reference basis for subsequently recognizing tasks. This process is called an enrollment. After the enrollment is completed, a second account is assigned for the user, and the second account corresponds to a voiceprint feature of the user.

The personalized service may include one or more of the following types:

1) A recommendation service: Using music as an example, different users may listen to different types of music, if all listening records of only one first account are used as a basis, recommendation confusion may be caused, for example, a children song is recommended to parents. The second accounts are introduced into this example to respectively record a listening record of each user, to facilitate targeted recommendations subsequently.

2) A feedback service: children and adults need different types of feedback mechanisms. Adults generally hope feedbacks to be simple and direct, and children have more sentiment requirements, and do not like rigid tones. In this example, different second accounts corresponding to adults and children may be used to provide different voice feedback services. An intelligent TV and the like may further provide different visual feedback services based on different second accounts.

3) An information management service: If all users use one first account to record memos and schedules, the memos and schedules cannot be distinguished, and confusion and contradiction (such as schedule conflicts) may occur in management. In this example, different second accounts are used to respectively record memos and/or schedule information of different users.

4) A privacy and security service: The first account involves payment services and social contacts, and has some privacy needs. Particularly, children need to be prevented from performing some inappropriate operations, such as making calls to colleagues, and performing online shopping. In this example, application permissions of a first account of different second accounts or application permissions of the device may be set.

In the solution provided in this example, user identity features are automatically recognized by using a recognition technology such as VPR or facial recognition, so that a more precise personalized service can be provided to the user without increasing user burden.

In this example, the plurality of users shares one first account. The second account may further set a main account and a plurality of secondary accounts. When the device recognizes voice of a child (secondary account), the device rejects an payment service authorization and the like; when the device recognizes that another adult secondary user performs the payment service authorization, an APP of the main user is awaken, and an information prompt whether to agree to make a payment or authorization is triggered. Only when the main account agrees, the foregoing secondary user can perform the payment and authorization process. The second account is classified into a main account and a secondary account, and obviously a priority of the main account is higher than that of the secondary account.

Example 2

Figure 13:
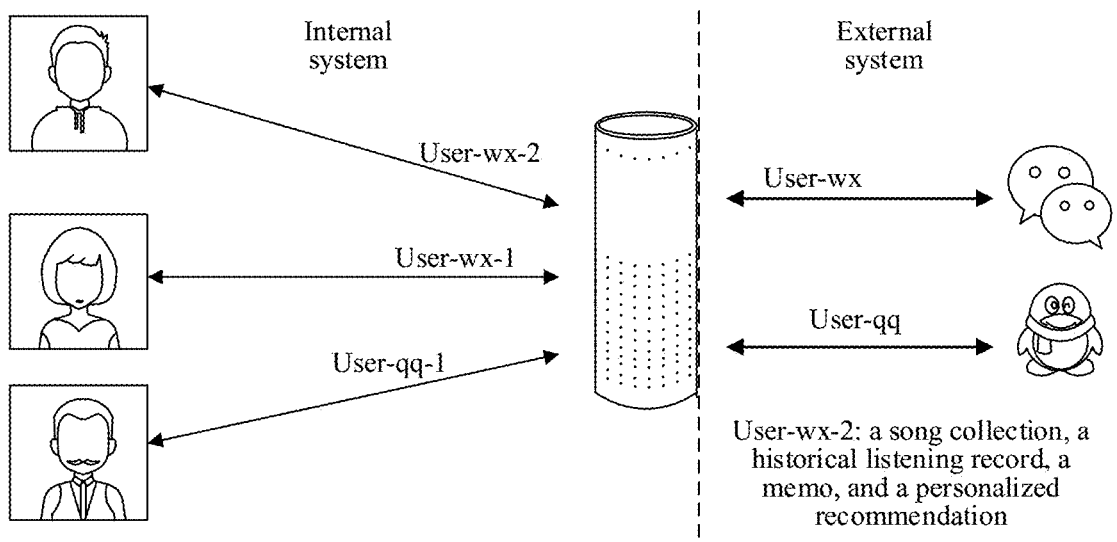
FIG. 13 is a schematic diagram of another correspondence between second accounts and a first account according to an embodiment of the present disclosure.

As shown in FIG. 13, the solution provided in this example allows the same speaker to be bound with more than one first account. Different users may use the same first account, and one first account may correspond to a plurality of first accounts simultaneously. During use, a user identity automatically determines a second account corresponding to the current user by using the VPR technology.

If it is currently detected that an account corresponding to a user using the speaker is User-wx-2, a personalized service is provided based on the second account. As shown in FIG. 9, the personalized service may include: a song collection, a historical listening record, a memo, a personalized recommendation and the like.

Figure 14:
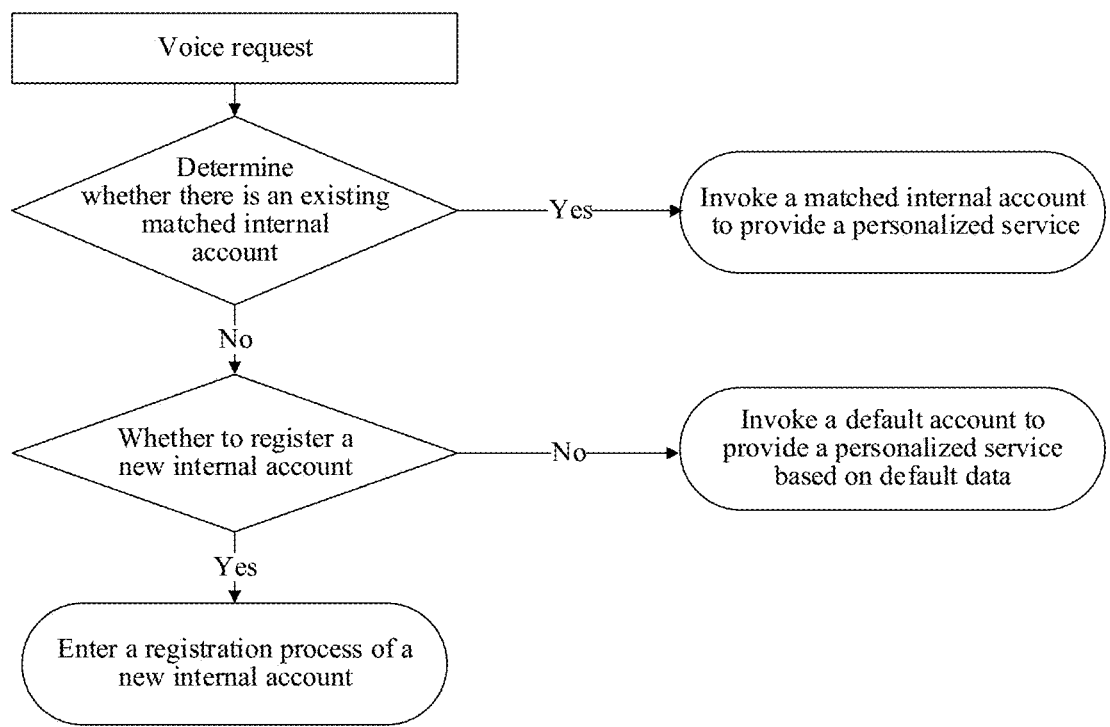
FIG. 14 is an information processing method based on a voiceprint feature according to an embodiment of the present disclosure.

As shown in FIG. 14, this example provides a personalized information processing method.

A voice request inputted by a user is received, and after the voice request is received, the speaker or a management device of the speaker determines, by using a voiceprint extraction technology, whether a voiceprint feature of current acquired voice matches a voiceprint feature of a known second account.

If the matching is successful, a matched second account is invoked to provide a personalized service. For example, user preference information of a matched second account is invoked to perform personalized voice interactions, and provide personalized services.

If the matching is not successful, the following two situations may exist: a. a new user; b. a known user, but the recognition is not successful. Therefore, in specific product design, the following different considerations may exist:

3) To not affect use of the user, for unrecognized voice, default user data corresponding to a default account is invoked first to provide the personalized service.

4) It is hoped to establish a corresponding second account for a new user, or a new corpus is added to an updated voiceprint model for an unrecognized user. In this case, a new process is triggered to perform voice registration (or supplementary registration). Because this interaction may interrupt normal communication of the user, when to trigger the process or under what situation the process is triggered needs to be specifically considered during product design.

Figure 15:
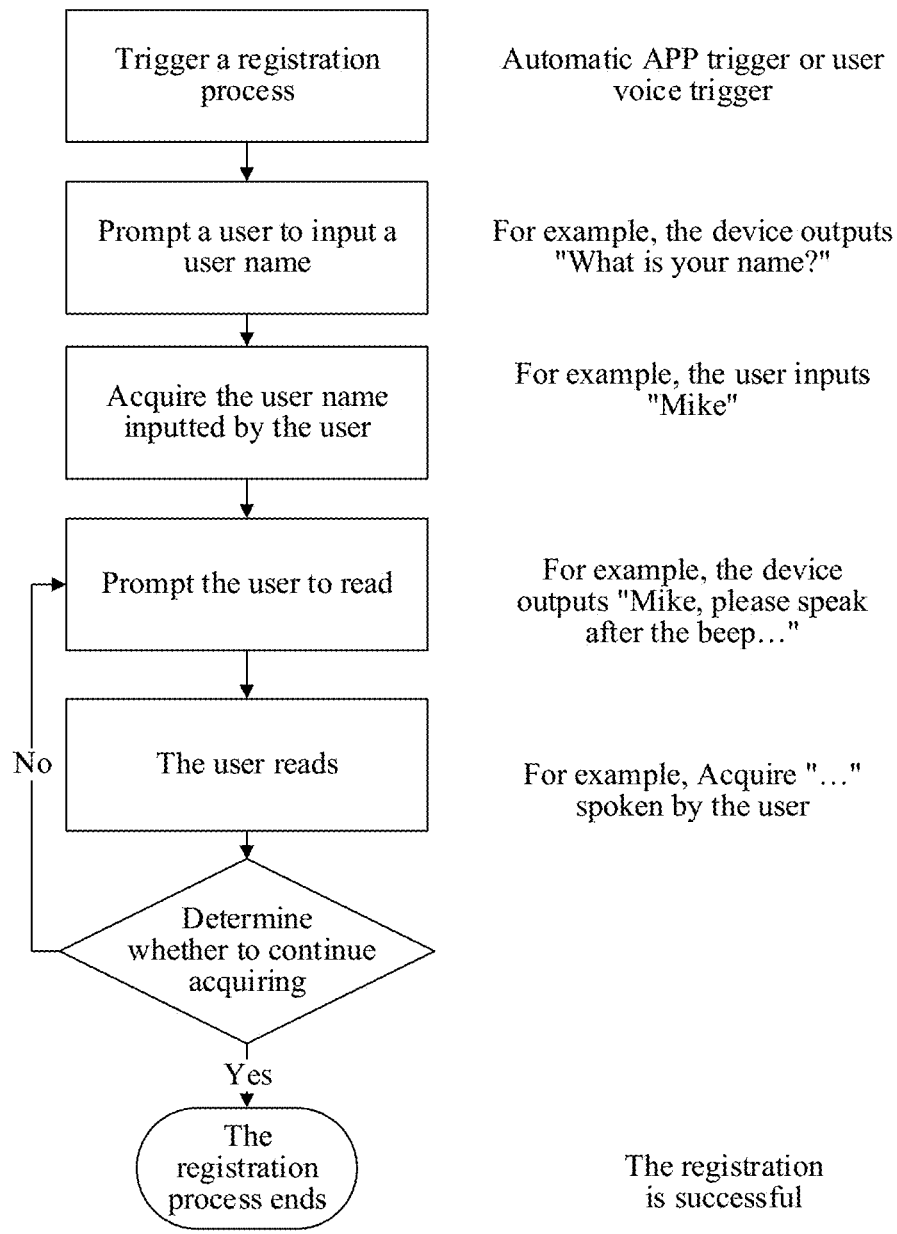
FIG. 15 is a schematic diagram of a registration process of an internal account based on a voiceprint feature according to an embodiment of the present disclosure.

As shown in FIG. 15, the following provides a second account registration method based on an active registration mechanism, including:

A registration mechanism is triggered, to start a registration process based on voice. A specific trigger manner may include: automatic APP trigger or user voice trigger.

Prompt a user to input a user name, and then the user name is recognized and stored. For example, the device outputs "What is your name?".

Acquire the user name inputted by the user. For example, the user inputs "Mike".

Prompt the user to read and input voice, which may be inputted repeatedly. For example, the device outputs "Mike, please speak after the beep . . . ".

The user reads, and acquires read voice of the user. For example, " . . . " spoken by the user is acquired.

This manner may also be used to supplement a new training corpus.

6) Determine whether to continue acquiring, if not, return to prompt the user to read, and if yes, end the registration process.

The trigger of the registration process of the voiceprint extraction has two trigger mechanisms: passive trigger and active trigger.

The passive trigger requires the user to initiate a registration process, which may be triggered by using an APP bound with the speaker or by using a specific voice instruction (for example, the user inputs "start to register a new user").

The speaker may also actively trigger the registration process. Specifically, in the interactive process in FIG. 3, when the speaker detects an unknown user, after the speaker actively initiates a registration process, prompts the user whether to perform voiceprint registration ("whether to register a new user?"), and obtains an affirmative answer of the user (e.g. "Yes"), the registration process is triggered.

Figure 16:
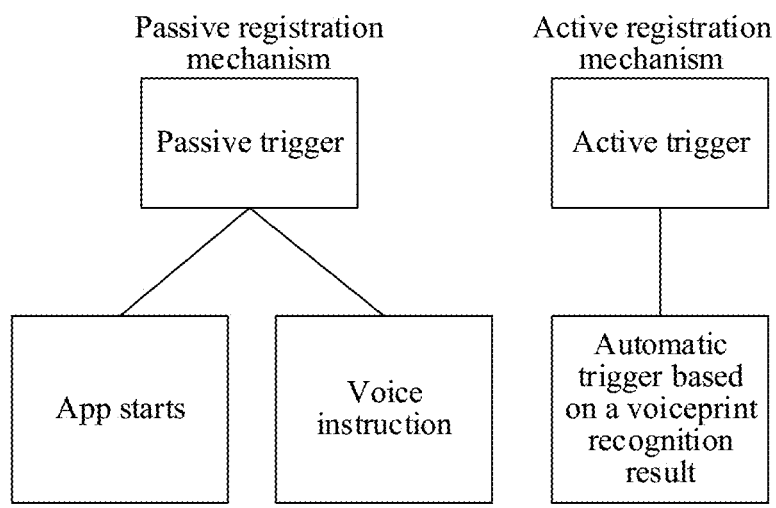
FIG. 16 is a schematic diagram of two registration mechanisms according to an embodiment of the present disclosure.

The passive trigger based on the voice instruction and the active trigger based on a VPR result may rely on only voice interactions to complete registration, without the help of an additional tool (such as a mobile phone APP). FIG. 16 shows two registration mechanisms: a passive registration mechanism and an active registration mechanism. In the passive registration mechanism, the registration process is passively triggered, and usually after an APP of the multimedia device is started, a voice instruction that is for indicating registration and that is inputted by the user is acquired. In the active registration mechanism, the registration process is actively triggered, specifically for example, automatically triggered based on a VPR result.

In this example, any technical solution in which performance meets requirements, such as an algorithm based on an vector or an algorithm based on depth learning, may be used. An integrated solution of VPR unrelated to a specific voiceprint algorithm in the voice interaction is shown in FIG. 17.

Figure 17:
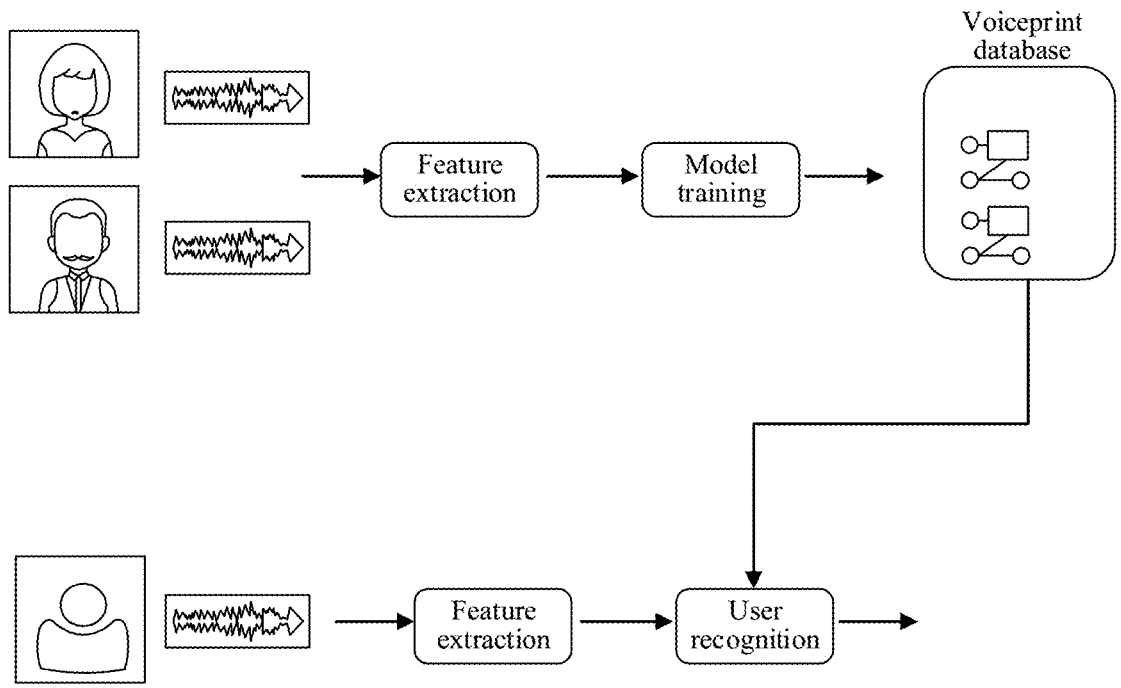
FIG. 17 is a schematic flowchart of an information processing method according to an embodiment of the present disclosure.

As shown in FIG. 17, the personalized information processing method may be divided into a registration phase and an application phase.

The registration phase:

1) Several pieces of voice data of the user is acquired through the foregoing registration process (FIG. 15).

2) Through the algorithm-related feature extraction and model training process, a specific voiceprint feature is generated for each user, and stored in a voiceprint database. The same process may also be used to supplement the corpus to update the voiceprint feature. The only difference lies in: During training, a new corpus is used to be added on all or some old corpora as basic data for extracting voiceprints.

The application phase:

1) New voice arrives, and a corresponding voiceprint feature is generated by means of feature extraction same as that in the registration phase.

2) Perform user recognition. Specifically, similarity (algorithm-related) comparison may be performed on an acquired voiceprint feature and a registered voiceprint feature, to obtain a comparison result: matching a user or being an unknown user, to determine a second account.

3) Perform subsequent interactive process according to a matching result.

Example 3

Figure 18:
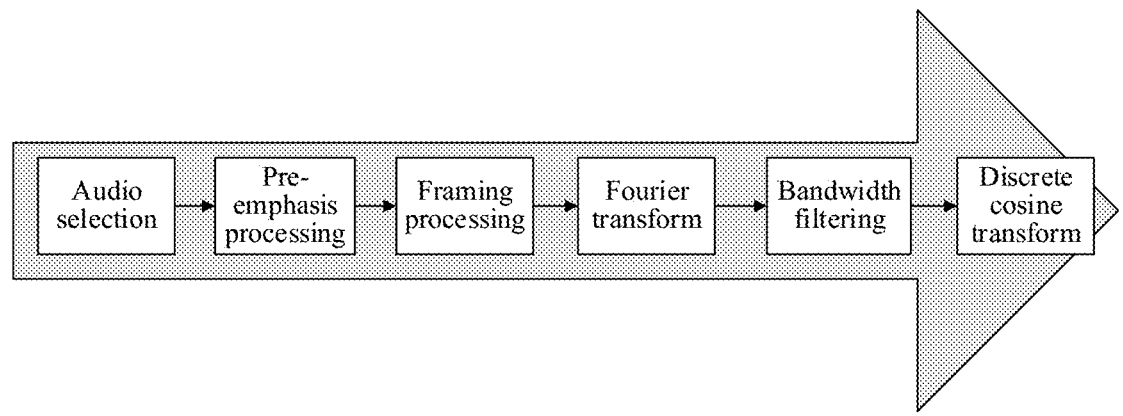
FIG. 18 is a schematic flowchart of a voiceprint feature extraction according to an embodiment of the present disclosure.

As shown in FIG. 18, this example provides a voiceprint extraction method, including: audio selection, pre-emphasis processing, framing processing, Fourier transform, bandwidth filtering, and discrete cosine transform.

1) The audio selection: The speaker generally uses a multi-microphone pickup solution. Therefore, a signal needs to be selected from a plurality of voice signals to perform feature extraction. In this example, an acquired voice signal with the largest signal energy is used to perform feature extraction. The energy is defined as follows:

$$E = \frac{1}{N}\sum_{i=0}^{N} x_i$$

where N represents a quantity of sample points of a voice segment, and $x_i$ represents an amplitude of an $i^{th}$ sample point.

2) The pre-emphasis processing: Enhance a high-frequency part by using filtering, and a filter transfer function is as follows:

$$H(z) = 1 - \alpha \cdot z^{-1}$$

where a typical value of ∂ ranges from 0.93 to 0.97. The high frequency herein may be a band part whose frequency is higher than a specific frequency.

3) The framing: Framing processing is performed on a pre-processed signal, every 10 ms is one frame, and the frame length is 25 ms. For 1s voice whose sampling rate is 16 kHz, 100 frames of data are obtained through the framing, and each frame of data includes 400 data points. The framing may use a window function such as a Hanning window, a Hamming window, or a rectangular window.

4) The discrete Fourier transform: For each frame of audio data, a fast Fourier algorithm is used to perform discrete Fourier transform, and an amplitude of each coefficient is taken after the transform.

5) The bandwidth filtering: A Fourier coefficient obtained in the foregoing step is evenly divided in a Mel dimension. The Mel dimension is defined as follows:

$$Mel(f) = 2595 \log_{10}\left(1 + \frac{f}{700}\right)$$

Figure 19:
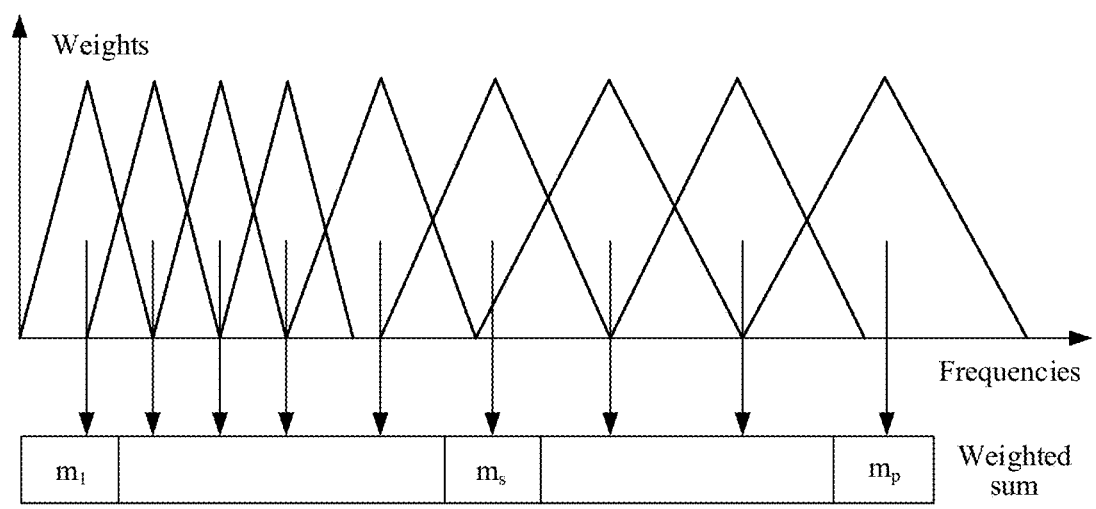
FIG. 19 is a schematic distribution diagram of a weighted sum of sonic energy in a voiceprint feature extraction according to an embodiment of the present disclosure.

FIG. 19 is a schematic distribution diagram of a weighted sum of energy in the Mel dimension. The horizontal coordinates are frequencies, and the vertical coordinates are weights corresponding to frequency sound waves. The weighted value herein is a value ranging from 0 to 1. In FIG. 16, m1 is an energy weighted sum of frequency sound waves in a first interval; ms is a weighted sum of frequency sound waves in an s-th interval; and mp is an energy weighted sum of frequency sound waves in an m-th interval. p is greater than s, and both p and s are positive integers.

The Mel dimension may be used for representing a perceptual characteristic of ears for sound. Usually, perception of ears for sound is non-linear, but the Mel dimension is a measurement for the non-linear sound perception.

In this solution, a pre-determined quantity of intervals evenly divided in the Mel dimension (for example, 25 intervals) is selected, and a coefficient of each interval is added up to obtain a coefficient vector of bandwidth filtering. The coefficient vector is formed by 25 coefficients (25 dimensions) corresponding to 25 intervals.

6) The discrete cosine transform: Discrete cosine transform is performed after the log is taken for the bandwidth filtering, and the first 13 coefficients are taken to obtain a Mel-frequency cepstral coefficient (MFCC). First-order and second-order differences are taken for the MFCCs of consecutive frames to obtain a final feature vector. The feature vector herein may be a 39-dimensional vector including 39 feature values. The MFCC is a Mel-frequency cepstral coefficient, and is a feature extraction method in voice signal processing.

In the process for obtaining the MFCC, it is found according to researches on ear hearing mechanisms that, ears have different aural sensitivities for sound waves of different frequencies. Voice signals from 200 Hz to 5000 Hz have the greatest impact on voice intelligibility. When two sounds with unequal loudnesses act on ears, the existence of a frequency component with a higher loudness may affect the feelings of a frequency component with a lower loudness, and makes the feelings imperceptible. This phenomenon is called a masking effect. A distance of sound with a lower frequency transferred in an upcoming wave of a basilar membrane of an inner cochlea is greater than sound with a higher frequency. A low pitch easily masks a high pitch, and the high pitch cannot easily mask the low pitch. A critical bandwidth masked by sound at a lower frequency is lower than that at a higher frequency. Therefore, a set of band pass filters are arranged in a band from a low frequency to a high frequency according to a descending order of density of critical bandwidths, to perform filtering on input signals. Signal energy outputted by each band pass filter is used as a basic feature of the signal, and the feature may further be processed to be used as an input feature of voice, to further obtain the MFCC. This MFCC obtaining manner has robustness, more conforms to hearing characteristics of ears, and still has good recognition performance when a signal to noise ratio is reduced.

Through the feature extraction, 100 39-dimensional features are obtained for every 1s of voice data (with a sampling rate of 16 k).

The following provides a voiceprint feature recognition model for training:

In this example, VPR is performed based on the Gaussian mixture model-universal background model (GMM-UBM).

Step 1: Use external data to train a GMM-UBM model. In this solution, 100 GMMs are used, dimensions of each GMM are unrelated (39 dimensions), and specific Gaussian data may be adjusted according to actual data. External data is obtained by acquiring voice of a large quantity of people (different genders, ages, and accents).

The GMM is defined as follows:

$$GMM = \Sigma_{j-1}^{M}(u_j; \sigma_j)$$

where G is a multivariate Gaussian distribution, $\mu$ and $\sigma_j$ are its mean and covariance matrices, and $\sigma$ is a diagonal matrix. M is a Gaussian quantity.

The model is trained by using an expectation maximization (EM) algorithm.

Step 2: Calculate a super vector (SV). For a user voice feature, a mean of Gaussian distributions of the GMM-UBM is adjusted according to a maximum-likelihood criterion. The formula is as follows:

$$\underset{v}{\mathrm{maxarg}}\, p(GMM/D)$$

where GMM is an inflated GMM trained in step 1, D is a voice feature, and v is a to-be-adjusted Gaussian mean.

All adjusted Gaussian means jointly construct an SV. In the training phase, the SV is stored as a voiceprint feature of the user.

SV matching. In the application phase, for to-be-determined voice, a specific SV is obtained through the foregoing feature extraction and SV calculation. The SV and an SV in the voiceprint database are used to respectively calculate a cosine distance $dist(sv_1, sv_2)$:

$$dist(sv_1, sv_2) = \frac{sv_1 * sv_2}{|sv_1| \, || \, sv_2|}$$

A minimum one (assuming that the distance is L=min $dist(sv_1, sv_2)$) is selected from all distances. If L is greater than a preset threshold $L_{ref}$, it is regarded that the SV is matched, and it is determined that unknown voice is a user matching the SV; otherwise, the unknown voice is from an unregistered user.

The voiceprint feature recognition may include:

According to different requests for voice, the VPR may be classified into a text related VPR technology and a text unrelated VPR technology. The voice whose text related request is for voiceprint extraction is reading specific text (for example, speaking "Hello, Tencent" is mandatory), and the text unrelated request is not limited as above.

For example, the text related VPR only uses voice of an awaken word to recognize a user identity. The advantages of this solution are that the user registration burden is small (only a short awaken word needs to be read), and the calculations are small; and the disadvantages are that the voice is short, and the algorithm robustness is low.

For another example, the text unrelated VPR uses voice of awaken+interactive instructions to recognize a user identity. The advantage of this solution is that the algorithm robustness is good (the voice is long), but the calculations are large and may also be increased accordingly, and the user registration burden is large.

In conclusion, the solution provided in this embodiment of the present disclosure is an incremental improvement of the existing solutions. On the premise of not changing the original interactive manner and not increasing the user interactive burden, through a small quantity of one-time setups of the user, an intelligent speaker can be used to provide more personalized recommendation, feedback, daily management, and better security and privacy protection. By using this solution, the intelligent speaker can significantly improve user experience in a multi-user home environment.

In some cases, specific voice passwords (such as "Open Sesame" and "Lovely Rabbits") may be used to distinguish different users, to switch to the current corresponding second account.

2) Different awaken words are assigned for different users to distinguish the users. For example, if different users have different awaken words, the different users use different awaken instructions to awaken the device.

3) Facial recognition is used to perform identity recognition.

4) No specific users are recognized. Instead, rough group distributions (young men, elderly women, boys and the like) are recognized, and personalized interactions are performed with each group, which does not need user registration, but a pre-training voiceprint model is needed, and has large personalization granularity.

5) In addition to an MFCC feature, the voice feature may use a Fourier coefficient, a filterbank, a log filterbank, and the like.

6) The VPR model may use another VPR technology.

In conclusion, the VPR is not limited to any one of the foregoing.

In the several embodiments provided in this application, it needs be understood that the disclosed device and method may be implemented in other manners. The described device embodiments are merely exemplary. For example, the unit division is merely logical function division and may be other division during actual implementation. For example, multiple units or components may be merged or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in the same place, or may be distributed to many network units. Some or all of the units need to be selected according to actual requirements to implement the purpose of the solution of the embodiments.

In addition, functional units in the embodiments of the present disclosure may be all integrated in a processing module, each unit is separately used as a unit, or two or more units are integrated in a unit. The integrated unit may be implemented in a form of hardware, or may be implemented in form of hardware plus a software functional unit.

A person of ordinary skill may understand that all or some steps for implementing the foregoing method embodiment may be completed by a program instructing related hardware, the foregoing program may be stored in a computer readable storage medium, and when being executed, the program performs steps including the foregoing method embodiment.

Alternatively, when the integrated module in the present disclosure is implemented in the form of a software function module and sold or used as an independent product, the integrated module may be stored in a computer readable storage medium. Based on such an understanding, the technical solutions of the embodiments of the present disclosure essentially or the part contributing to the existing technology may be implemented in a form of a software product. The computer software product is stored in a storage medium, and includes several instructions for instructing a computer device (which may be a personal computer, a management device, a network device, or the like) to perform all or some of the methods in the embodiments of the present disclosure. The storage medium includes: any media that can store program code, such as a portable storage device, a ROM, a magnetic disk, or a compact disc.

The foregoing descriptions are merely preferred embodiments of the present disclosure, but not used to limit the protection scope of the present disclosure. Modifications that are made according to the principle of the present disclosure shall fall within the protection scope of the present disclosure.

INDUSTRIAL PRACTICABILITY

In the information processing method and system, and the storage medium in the embodiments of the present disclosure, a plurality of second accounts may be set for one first account of one multimedia device, and a service corresponding to preference information of a second account is obtained from a pre-determined system by using the first account, and provided to a user corresponding to the second account, so that a personalized requirement of the user can be met. For a situation in which the plurality of users share one multimedia device, a personalized service meeting a personalized requirement can also be provided, which has a positive beneficial effect. Meanwhile, the technical solutions in the embodiments of the present disclosure can be easily applied to various service providing systems, have characteristics of easy implementation and strong industrial replicability, and therefore have strong industrial achievability.

What is claimed is:

1. An information processing method, applied to a computing device having one or more processors and memory storing a plurality of programs to be executed by the one or more processors, the method comprising:
   assigning a first account for a multimedia device coupled to the computing device, the first account being associated with a first application service provider;
   assigning a plurality of second accounts associated with the first account for the multimedia device, each second account representing one user identifier and having associated user preference information;
   configuring a permission scope for each of the plurality of the second accounts;
   acquiring, via the multimedia device, a voice instruction from a user;
   identifying service request information according to the voice instruction;
   determining, from among the plurality of second accounts, a second account currently in use;
   identifying user preference information and a permission scope associated with the second account currently in use; and
   providing, based on the user preference information, the permission scope, and the service request information, a first service returned by the first application service provider to the user identifier represented by the second account currently in use, the providing comprising:
      obtaining, in a case that the permission scope of the second account is a first permission scope, the first service in the first permission scope by using the first account; and
      obtaining, in a case that the permission scope of the second account is a second permission scope, the first service in the second permission scope by using the first account, wherein the first permission scope is greater than the second permission scope.

2. The method according to claim 1, wherein the method further comprises:
   obtaining, based on the first account, a second service provided to the second account by the first application service provider, wherein the second service is different from the first service.

3. The method according to claim 1, wherein:
   acquiring the voice instruction comprises acquiring the voice instruction by using an operating system of the multimedia device, wherein the voice instruction is used for triggering the multimedia device to perform a pre-determined operation;
   determining, from among the plurality of second accounts, the second account currently in use comprises:
      performing voiceprint feature recognition on the voice instruction, to obtain a first voiceprint feature;
      matching the first voiceprint feature with a second voiceprint feature, wherein the second voiceprint feature is a voiceprint feature corresponding to one of a plurality of registered second accounts associated with the multimedia device; and selecting, according to a matching result, the second account currently in use by the multimedia device; and providing the first service comprises performing the pre-determined operation in response to the voice instruction.

4. The method according to claim 3, wherein:

the pre-determined operation is different from an account registration operation; and a selecting the second account currently in use by the multimedia device comprises:

registering, with the multimedia device, a new second account based on the first voiceprint feature in a case that the first voiceprint feature does not have a match; and selecting the registered new second account as the second account currently in use by the multimedia device.

5. The method according to claim 3, wherein the method further comprises:

outputting a registration prompt voice in a case that the first voiceprint feature does not have a match;

acquiring a registration answer voice from the user; and registering, with the multimedia device, a new second account based on the first voiceprint feature in a case that the registration answer voice indicates registering a new account.

6. The method according to claim 5, wherein the method further comprises:

determining, in a case that the registration answer voice indicates not registering a new account, that the multimedia device is currently using a default second account to provide a multimedia service.

7. The method according to claim 3, wherein selecting, according to the matching result, the second account currently in use by the multimedia device comprises:

determining, in a case that the first voiceprint feature matches the second voiceprint feature, that the multimedia device is currently using the second account corresponding to the second voiceprint feature.

8. The method according to claim 3, wherein acquiring the voice instruction by using the operating system of the multimedia device comprises:

acquiring a status switching instruction by using the operating system of the multimedia device; and performing the pre-determined operation in response to the voice instruction comprises:

switching, by the multimedia device, from a first status to a second status according to the status switching instruction, wherein a power consumption of the multimedia device in the first status is lower than that in the second status.

9. The method according to claim 3, wherein acquiring the voice instruction by using the operating system of the multimedia device comprises acquiring a service obtaining instruction by using the operating system of the multimedia device;

the method further comprises:

switching, by the multimedia device, from a first status to a second status according to the service obtaining instruction, wherein a power consumption of the multimedia device in the first status is lower than that in the second status; and wherein performing the pre-determined operation in response to the voice instruction comprises providing a multimedia service based on the second account currently in use according to the service obtaining instruction after switching to the second status.

10. The method according to claim 1, wherein the method further comprises:

receiving a configuration instruction, wherein the configuration instruction is provided by the second account whose permission scope is the first permission scope; and configuring the second permission scope based on the configuration instruction.

11. A computing device comprising:

one or more processors;

memory; and a plurality of programs stored in the memory that, when executed by the one or more processors, cause the computing device to perform a plurality of operations including:

assigning a first account for a multimedia device coupled to the computing device, the first account being associated with a first application service provider;

assigning a plurality of second accounts associated with the first account for the multimedia device, each second account representing one user identifier and having associated user preference information;

configuring a permission scope for each of the plurality of the second accounts;

acquiring, via the multimedia device, a voice instruction from a user;

identifying service request information according to the voice instruction;

determining, from among the plurality of second accounts, a second account currently in use;

identifying user preference information and a permission scope associated with the second account currently in use; and providing, based on the user preference information, the permission scope, and the service request information, a first service returned by the first application service provider to the user identifier represented by the second account currently in use, the providing comprising:

obtaining, in a case that the permission scope of the second account is a first permission scope, the first service in the first permission scope by using the first account; and obtaining, in a case that the permission scope of the second account is a second permission scope, the first service in the second permission scope by using the first account, wherein the first permission scope is greater than the second permission scope.

12. The computing device according to claim 11, wherein the plurality of operations further comprise:

obtaining, based on the first account, a second service provided by the first application service provider, wherein the second service is different from the first service.

13. The computing device according to claim 11, wherein:

acquiring the voice instruction comprises acquiring the voice instruction by using an operating system of the multimedia device, wherein the voice instruction is used for triggering the multimedia device to perform a pre-determined operation;

determining, from among the plurality of second accounts, the second account currently in use comprises:

performing voiceprint feature recognition on the voice instruction, to obtain a first voiceprint feature;

matching the first voiceprint feature with a second voiceprint feature, wherein the second voiceprint feature is a voiceprint feature corresponding to one of a plurality of registered second accounts associated with the multimedia device; and selecting, according to a matching result, the second account currently in use by the multimedia device; and providing the first service comprises performing the pre-determined operation in response to the voice instruction.

14. The computing device according to claim 13, wherein:
the pre-determined operation is different from an account registration operation; and
a selecting the second account currently in use by the multimedia device comprises:
registering, with the multimedia device, a new second account based on the first voiceprint feature in a case that the first voiceprint feature does not have a match; and
selecting the registered new second account as the second account currently in use by the multimedia device.

15. The computing device according to claim 13, wherein the plurality of operations further comprise:
outputting a registration prompt voice in a case that the first voiceprint feature does not have a match;
acquiring a registration answer voice from the user; and
registering, with the multimedia device, a new second account based on the first voiceprint feature in a case that the registration answer voice indicates registering a new account.

16. A non-transitory computer-readable storage medium, storing one or more programs configured for execution by one or more processors of a computing device, the one or more programs including instructions for:
assigning a first account for a multimedia device coupled to the computing device, the first account being associated with a first application service provider;
assigning a plurality of second accounts associated with the first account for the multimedia device, each second account representing one user identifier and having associated user preference information;
configuring a permission scope for each of the plurality of the second accounts;

acquiring, via the multimedia device, a voice instruction from a user;
identifying service request information according to the voice instruction;
determining, from among the plurality of second accounts, a second account currently in use;
identifying for user preference information and a permission scope associated with the second account currently in use; and
providing, based on the user preference information, the permission scope, and the service request information, a first service returned by the first application service provider to the user identifier represented by the second account currently in use, the providing comprising:
obtaining, in a case that the permission scope of the second account is a first permission scope, the first service in the first permission scope by using the first account and
obtaining, in a case that the permission scope of the second account is a second permission scope, the first service in the second permission scope by using the first account, wherein the first permission scope is greater than the second permission scope.

17. The method according to claim 1, wherein the permission scope for the second account currently in use defines types and attributes of multimedia services that are obtainable by the second account currently in use.

18. The method according to claim 1, wherein configuring the permission scope for each of the plurality of second accounts comprises determining at least one aspect of the permission scope in accordance with a user attribute associated with the user identifier of the second account.

19. The method according to claim 1, wherein:
obtaining the first service in the first permissions scope by using the first account comprises obtaining a charged service provided by the first application service provider; and
obtaining the first service in the second permissions scope by using the first account comprises obtaining a free service provided by the first application service provider.

20. The method according to claim 1, wherein the method further comprises configuring an application mode of the multimedia device in accordance with the user preference information.

* * * * *